US011606582B2

(12) United States Patent
Du

(10) Patent No.: US 11,606,582 B2
(45) Date of Patent: Mar. 14, 2023

(54) METHOD FOR CO-HOSTING IN LIVE STREAMING AND SERVER

(71) Applicant: BEIJING DAJIA INTERNET INFORMATION TECHNOLOGY CO., LTD., Beijing (CN)

(72) Inventor: Haitao Du, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/395,688

(22) Filed: Aug. 6, 2021

(65) Prior Publication Data
US 2022/0141500 A1 May 5, 2022

(30) Foreign Application Priority Data

Oct. 29, 2020 (CN) .......................... 202011186839.0

(51) Int. Cl.
*H04N 21/218* (2011.01)
*H04N 21/2187* (2011.01)
(Continued)

(52) U.S. Cl.
CPC ..... *H04N 21/2187* (2013.01); *H04N 21/2393* (2013.01); *H04N 21/4788* (2013.01)

(58) Field of Classification Search
None
See application file for complete search history.

(56) References Cited

U.S. PATENT DOCUMENTS 9,973,819 B1 * 5/2018 Taylor ................ G06Q 30/0643
10,820,034 B2 * 10/2020 Amento ............... H04N 21/472
(Continued)

FOREIGN PATENT DOCUMENTS

CN 108989836 A 12/2018
CN 109618191 A 4/2019
(Continued)

OTHER PUBLICATIONS

European Patent Office, European Search Report pursuant to Rule 61 EPC, dated Feb. 1, 2022 in Patent Application No. 21190354.7, which is a foreign counterpart to this U.S. Application.
(Continued)

*Primary Examiner* — An Son P Huynh
(74) *Attorney, Agent, or Firm* — Koiitch Romano Dascenzo Gates LLC

(57) ABSTRACT

A method for co-hosting in live streaming includes sending, in response to receiving a co-hosting request from a live streaming account, the co-hosting request to a target user account for co-hosting; and sending, in response to receiving co-hosting grant information from the target user account, a first live data stream and a second live data stream to a viewer account. The first live data stream corresponds to the target user account, the second live data stream corresponds to the live streaming account. The second live data stream is pushed by the live streaming account using a target live streaming tool, and the target live streaming tool is configured to push the second live data stream for the live streaming account and pull the first live data stream for the live streaming account.

19 Claims, 14 Drawing Sheets

(51) Int. Cl.
*H04N 21/239* (2011.01)
*H04N 21/4788* (2011.01)

(56) References Cited

U.S. PATENT DOCUMENTS

| | | | | |
|---|---|---|---|---|
| 11,082,467 | B1* | 8/2021 | Hartnett | H04N 21/234363 |
| 2007/0157281 | A1* | 7/2007 | Ellis | H04N 21/4667 |
| | | | | 725/74 |
| 2008/0040475 | A1* | 2/2008 | Bosworth | G06Q 50/01 |
| | | | | 709/224 |
| 2008/0229215 | A1* | 9/2008 | Baron | G06N 3/006 |
| | | | | 715/751 |
| 2011/0078717 | A1* | 3/2011 | Drummond | H04N 21/4821 |
| | | | | 715/764 |
| 2012/0166433 | A1* | 6/2012 | Tseng | G06Q 50/01 |
| | | | | 707/E17.005 |
| 2012/0166532 | A1* | 6/2012 | Juan | G06Q 30/0224 |
| | | | | 709/204 |
| 2012/0257112 | A1* | 10/2012 | Fritsch | H04N 7/15 |
| | | | | 348/580 |
| 2014/0081954 | A1* | 3/2014 | Elizarov | H04N 21/2408 |
| | | | | 707/722 |
| 2016/0006981 | A1* | 1/2016 | Bauman | H04N 21/4788 |
| | | | | 348/14.03 |
| 2016/0073055 | A1* | 3/2016 | Marsh | H04N 7/152 |
| | | | | 348/14.08 |
| 2016/0381427 | A1* | 12/2016 | Taylor | H04N 21/4826 |
| | | | | 725/13 |
| 2017/0006322 | A1* | 1/2017 | Dury | H04N 21/254 |
| 2019/0122045 | A1 | 4/2019 | Ravi et al. | |
| 2020/0076754 | A1* | 3/2020 | Kim | H04L 51/222 |
| 2020/0275149 | A1* | 8/2020 | Su | H04N 21/643 |
| 2021/0112288 | A1* | 4/2021 | Chen | H04N 21/8547 |
| 2021/0149536 | A1* | 5/2021 | Gao | A63F 13/355 |
| 2021/0337167 | A1* | 10/2021 | Garg | H04N 7/152 |
| 2022/0086509 | A1 | 3/2022 | Geng et al. | |

FOREIGN PATENT DOCUMENTS

| | | |
|---|---|---|
| CN | 110213608 A | 9/2019 |
| CN | 111050185 A | 4/2020 |
| CN | 111372090 A | 7/2020 |
| CN | 111385592 A | 7/2020 |
| CN | 111416989 A | 7/2020 |
| CN | 111818359 A | 10/2020 |
| WO | 2017219347 A1 | 12/2017 |

OTHER PUBLICATIONS

Communication pursuant to Article 94(3) EPC of European application No. 21190354.7 dated Feb. 15, 2022, which is a foreign counterpart to this U.S. Application.
The State Intellectual Property Office of People's Republic of China, First Office Action in Patent Application No. CN202011186839.0 dated Mar. 10, 2022, which is a foreign counterpart application corresponding to this U.S. Patent Application, to which this application claims priority.
The State Intellectual Property Office of People's Republic of China, First Office Action in Patent Application No. CN202011186839.0 dated Aug. 5, 2022, which is a foreign counterpart application corresponding to this U.S. Patent Application, to which this application claims priority.
European Patent Office, Communication pursuant to Article 94(3) EPC of European Application No. 21190354.7 dated Oct. 4, 2022.

* cited by examiner

METHOD FOR CO-HOSTING IN LIVE STREAMING AND SERVER

CROSS-REFERENCE TO RELATED APPLICATION

This application is based on and claims priority to Chinese Patent Application No. 202011186839.0, filed on Oct. 29, 2020, the disclosure of which is herein incorporated by reference in its entirety.

TECHNICAL FIELD

The present disclosure relates to the technical field of computers, and in particular, relates to a method for co-hosting in live streaming and a server.

BACKGROUND

With the continuous development of computer technologies, the live streaming industry is growing more rapidly. In the process of live streaming, an anchor can interact with other users to make the live streaming process more diversified and interesting. For example, the anchor communicates with other users via texts, or via co-hosting, or the like.

SUMMARY

Embodiments of the present disclosure provide a method for co-hosting in live streaming and a server.

According to a first aspect of the embodiments of the present disclosure, a method for co-hosting in live streaming is provided. The method includes:

sending a co-hosting request to a target user account in response to receiving the co-hosting request for the target user account from a live streaming account in a live streaming room;

acquiring a first live data stream in response to receiving co-hosting grant information from the target user account, the first live data stream corresponding to the target user account;

acquiring a second live data stream, the second live data stream corresponding to the live streaming account, the second live data stream being pushed by the live streaming account using a target live streaming tool, the target live streaming tool being configured to push the second live data stream for the live streaming account and pull the first live data stream for the live streaming account; and sending the first live data stream and the second live data stream to a viewer account in the live streaming room.

According to a second aspect of the embodiments of the present disclosure, a method for co-hosting in live streaming is provided. The method includes:

displaying a live streaming interface of a live streaming room, the live streaming room being created using a stream push function of a target live streaming tool, and the live streaming interface including a co-host control;

sending a co-hosting request to a server in response to a trigger operation on the co-host control, the co-hosting request being configured to request co-hosting with a target user account for co-hosting;

acquiring a first live data stream using the target live streaming tool in response to receiving co-hosting success information from the server, the first live data stream corresponding to the target user account; and displaying, in the live streaming interface, a live streaming picture of the live streaming account and a live streaming picture of the target user account based on a second live data stream and the first live data stream, the second live data stream corresponding to the live streaming account.

According to a third aspect of the embodiments of the present disclosure, a server is provided. The server includes:

a processor; and a memory configured to store at least one instruction executable by the at least one processor;

wherein the processor, when loading and executing the at least one instruction, is caused to perform the following processes:

sending a co-hosting request to a target user account in response to receiving the co-hosting request for the target user account from a live streaming account in a live streaming room;

acquiring a first live data stream in response to receiving co-hosting grant information from the target user account, the first live data stream corresponding to the target user account;

acquiring a second live data stream, the second live data stream corresponding to the live streaming account, the second live data stream being pushed by the live streaming account using a target live streaming tool, the target live streaming tool being configured to push the second live data stream for the live streaming account and pull the first live data stream for the live streaming account; and sending the first live data stream and the second live data stream to a viewer account in the live streaming room.

According to a fourth aspect of the embodiments of the present disclosure, a terminal is provided. The terminal includes:

a processor; and a memory configured to store at least one instruction executable by the at least one processor;

wherein the processor, when loading and executing the at least one instruction, is caused to perform the following processes:

displaying a live streaming interface of a live streaming room, the live streaming room being created using a stream push function of a target live streaming tool, and the live streaming interface including a co-host control;

sending a co-hosting request to a server in response to a trigger operation on the co-host control, the co-hosting request being configured to request co-hosting with a target user account for co-hosting;

acquiring a first live data stream using the target live streaming tool in response to receiving co-hosting success information from the server, the first live data stream corresponding to the target user account; and displaying, in the live streaming interface, a live streaming picture of the live streaming account and a live streaming picture of the target user account based on a second live data stream and the first live data stream, the second live data stream corresponding to the live streaming account.

According to a fifth aspect of the embodiments of the present disclosure, a non-transitory computer-readable storage medium is provided. The non-transitory computer-readable storage medium stores at least one instruction therein. The at least one instruction, when loaded and executed by a processor of a server, causes the server to perform the following processes:

sending a co-hosting request to a target user account in response to receiving the co-hosting request for the target user account from a live streaming account in a live streaming room;

acquiring a first live data stream in response to receiving co-hosting grant information from the target user account, the first live data stream corresponding to the target user account;

acquiring a second live data stream, the second live data stream corresponding to the live streaming account, the second live data stream being pushed by the live streaming account using a target live streaming tool, the target live streaming tool being configured to push the second live data stream for the live streaming account and pull the first live data stream for the live streaming account; and sending the first live data stream and the second live data stream to a viewer account in the live streaming room.

According to a sixth aspect of the embodiments of the present disclosure, a non-transitory computer-readable storage medium is provided. The non-transitory computer-readable storage medium stores at least one instruction therein. The at least one instruction, when loaded and executed by a processor of a terminal, causes the terminal to perform the following processes:

displaying a live streaming interface of a live streaming room, the live streaming room being created using a stream push function of a target live streaming tool, and the live streaming interface including a co-host control;

sending a co-hosting request to a server in response to a trigger operation on the co-host control, the co-hosting request being configured to request co-hosting with a target user account for co-hosting;

acquiring a first live data stream using the target live streaming tool in response to receiving co-hosting success information from the server, the first live data stream corresponding to the target user account; and displaying, in the live streaming interface, a live streaming picture of the live streaming account and a live streaming picture of the target user account based on a second live data stream and the first live data stream, the second live data stream corresponding to the live streaming account.

DETAILED DESCRIPTION

To make those of ordinary skill in the art better understand the technical solutions of the present disclosure, the following clearly and completely describes the technical solutions in the embodiments of the present disclosure with reference to the accompanying drawings.

It should be noted that the terms "first," "second," and the like in the specification and claims of the present disclosure and in the accompanying drawings are configured to distinguish between similar objects but do not necessarily indicate a specific order or sequence. It should be understood that the data used in such a way may be exchanged under proper conditions to make it possible to implement the described embodiments of present disclosure in sequences except those illustrated or described herein. The details described in the following exemplary embodiments do not represent all embodiments consistent with the present disclosure. On the contrary, these embodiments are only embodiments of a device and a method detailed in the appended claims and consistent with some aspects of the present disclosure.

User information involved in the present disclosure may be information authorized by users or fully authorized by various parties.

Currently, during co-hosting in live streaming, an anchor pulls a live data stream of a user for co-hosting, synthesizes a live data stream of an anchor account and the live data stream of the user for co-hosting, and then sends the synthesized live data stream to a server. The server distributes the synthesized live data stream to realize co-hosting in live streaming.

In the above processes, the anchor needs to push two live data streams, which imposes a high bandwidth requirement on the anchor terminal. Co-hosting live streaming cannot be implemented when the anchor terminal is in poor network conditions, resulting in a poor live streaming effect.

Figure 1:
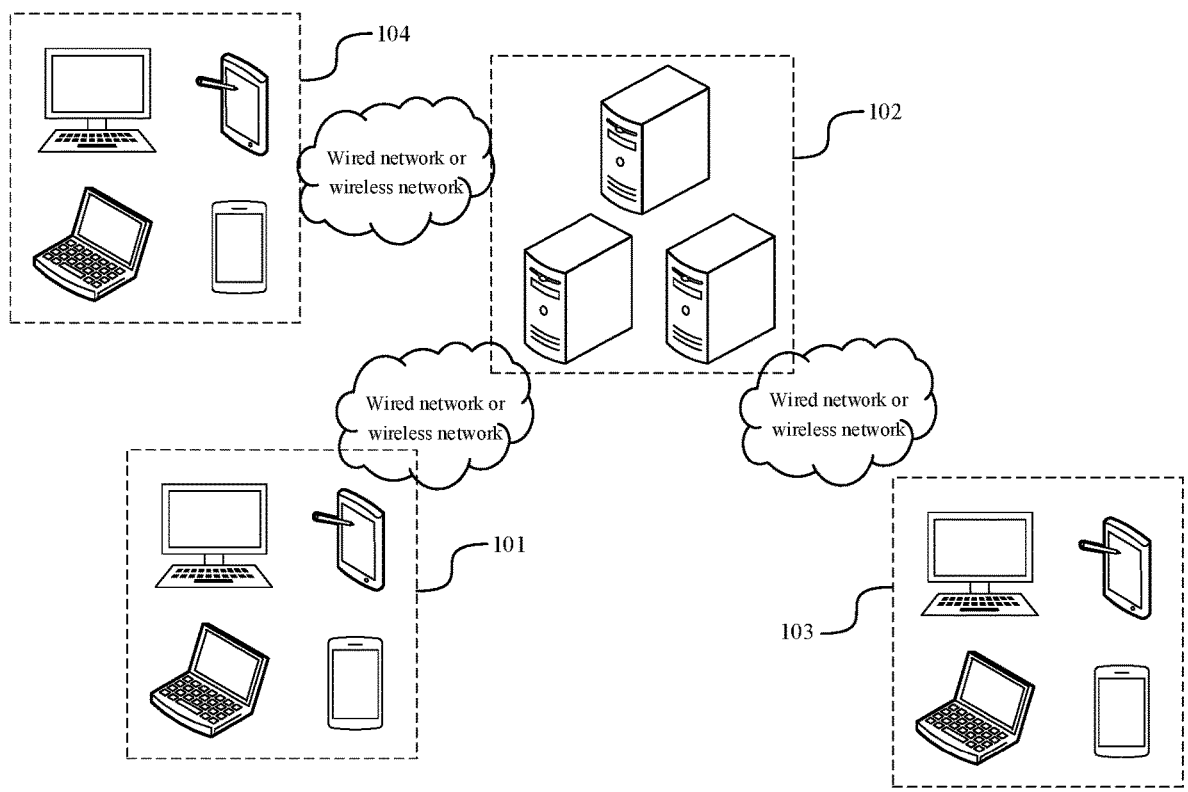
FIG. 1 is a schematic diagram of an implementation environment of a method for co-hosting in live streaming according to an exemplary embodiment.

FIG. 1 is a schematic diagram of an implementation environment of a method for co-hosting in live streaming according to an exemplary embodiment. Referring to FIG. 1, the implementation environment involves a first terminal 101, a server 102, a second terminal 103, and a third terminal 104.

The first terminal 101 may be at least one of: a smartphone, a smart watch, a tablet computer, a Moving Picture Experts Group Audio Layer III (MP3) player, a Moving Picture Experts Group Audio Layer IV (MP4) player, a laptop computer, and the like. The first terminal 101 is a terminal used by an anchor. The anchor accesses a web page for live streaming via the first terminal 101, and performs live streaming via the web page. The first terminal 101 acquires a live data stream of the anchor via a camera assembly, and sends the acquired live data stream to the server 102. The camera assembly is built in or externally connected to the first terminal 101, which is not limited in the embodiments of the present disclosure.

In live streaming by the anchor, the anchor may implement co-hosting with another user. The second terminal 103 is a terminal used by the user for co-hosting. Likewise, the second terminal 103 may be at least one of: a smartphone, a smart watch, a tablet computer, an MP3 player, an MP4 player, a laptop computer, and the like.

The server 102 may be at least one of: a server, a plurality of servers, a cloud server, a cloud computing platform, and a virtualization center. The server 102 receives the live data stream from the first terminal 101, and sends the live data stream to the third terminal 104 in response to receiving a data acquisition request from the third terminal 104. In some embodiments, there may be more or fewer servers 102, which is not limited in the embodiments of the present disclosure. The server 102 may also include other functional servers to provide more comprehensive and diverse services.

The third terminal 104 may be at least one of: a smartphone, a smart watch, a tablet computer, an MP3 player, an MP4 player, a laptop computer, and the like. The third terminal 104 is a terminal used by a viewer. The third terminal 104 acquires a thumbnail image of a live streaming room of the current live streaming from the server 102 and displays the acquired thumbnail image. The viewer sends a data acquisition request to the server 102 by triggering the thumbnail image corresponding to the live stream that the viewer wants to watch, receives the live data stream returned by the server 102, and displays a live streaming picture of the anchor based on the received live data stream.

The first terminal 101, the second terminal 103, and the third terminal 104 each may generally refer to one of a plurality of terminals, and this embodiment is illustrated by using the first terminal 101, the second terminal 103, and the third terminal 104 as examples. A person skilled in the art may understand that there may be more or fewer terminals, for example, there may be few terminals, or there may be dozens or hundreds of terminals, or more terminals. The number and device types of the terminals are not limited in the embodiments of the present disclosure.

Figure 2:
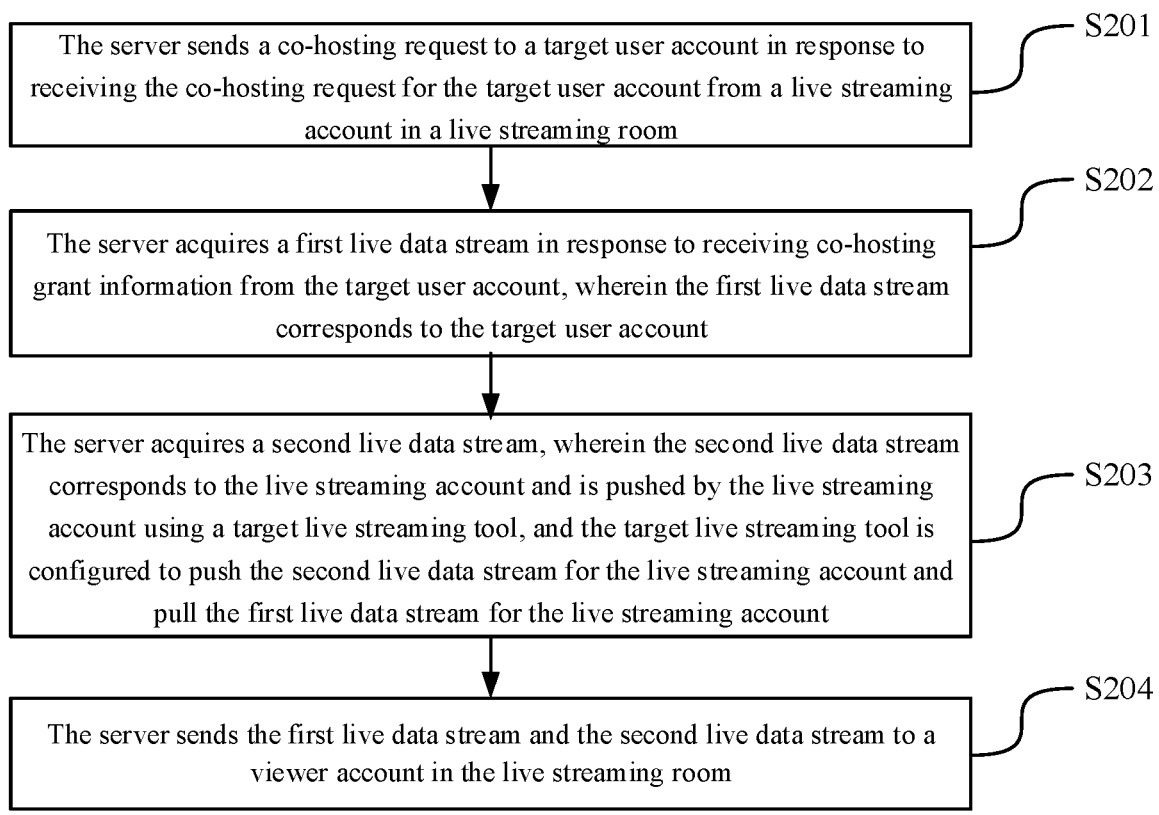
FIG. 2 is a flowchart of a method for co-hosting in live streaming according to an exemplary embodiment.

FIG. 2 is a flowchart of a method for co-hosting in live streaming according to an exemplary embodiment. Referring to FIG. 2, the method is applicable to a server, and includes the following processes.

In 201, the server sends a co-hosting request to a target user account in response to receiving the co-hosting request for the target user account from a live streaming account in a live streaming room.

In 202, the server acquires a first live data stream in response to receiving co-hosting grant information from the target user account, wherein the first live data stream corresponds to the target user account.

In 203, the server acquires a second live data stream, wherein the second live data stream corresponds to the live streaming account and is pushed by the live streaming account using a target live streaming tool. The target live streaming tool is configured to push the second live data stream for the live streaming account and pull the first live data stream for the live streaming account.

In 204, the server sends the first live data stream and the second live data stream to a viewer account in the live streaming room.

In the solution according to this embodiment of the present disclosure, in the case that a co-hosting request from the live streaming account is received, the co-hosting request is sent to the target user account for co-hosing; and in the case that co-hosting grant information from the target user account is received, the second live data stream pushed by the live streaming account using the target live streaming tool and the first live data stream of the target user account are both sent to a terminal corresponding to a viewer account, such that the terminal corresponding to the viewer account plays the two live data streams simultaneously, thereby implementing the co-hosting between the target user account and the live streaming account. The live streaming account does not need to push two live data streams, and co-hosting live streaming can be implemented even in the case that the live streaming account is under poor network conditions, thereby improving the live streaming effect.

In some embodiments, the method further includes:
sending first co-hosting success information to the live streaming account, the first co-hosting success information being configured to instruct the live streaming account to acquire the first live data stream; and
sending the first live data stream to the live streaming account in response to receiving a first data acquisition request from the live streaming account.

In some embodiments, the method further includes:
sending second co-hosting success information to the target user account, the second co-hosting success information being configured to instruct the target user account to acquire the second live data stream to the target user account; and
sending the second live data stream to the target user account in response to receiving a second data acquisition request from the target user account.

In some embodiments. The method further includes:
sending co-hosting start information to the viewer account in the live streaming room, the co-hosting start information being configured to instruct the viewer account to acquire the first live data stream and the second live data stream; and
sending the first live data stream and the second live data stream to the viewer account in the live streaming room in response to receiving a third data acquisition request from the viewer account.

In some embodiments, the method further includes:
sending co-hosting termination information to the live streaming account, the target user account, and the viewer account in response to receiving a co-hosting termination request, the co-hosting termination information being configured to instruct the live streaming account and the target user account to stop acquiring the live data stream of each other, and instruct the viewer account to stop acquiring the first live data stream, and the co-hosting termination request being triggered by either of the live streaming account or the target user account.

Figure 3:
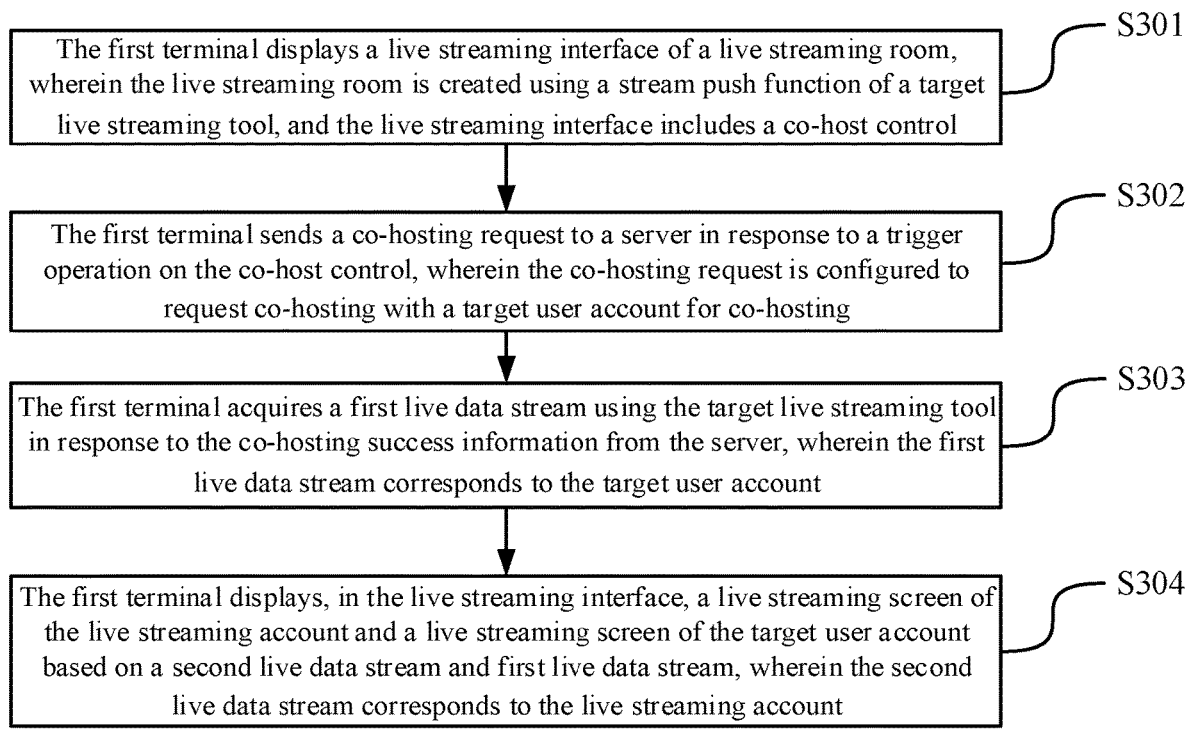
FIG. 3 is a flowchart of a method for co-hosting in live streaming according to an exemplary embodiment.

FIG. 3 is a flowchart of a method for co-hosting in live streaming according to an exemplary embodiment. Referring to FIG. 3, the method is applicable to a terminal corresponding to a live streaming account, that is, the first terminal, and includes the following processes.

In 301, the first terminal displays a live streaming interface of a live streaming room, wherein the live streaming room is created using a stream push function of a target live streaming tool, and the live streaming interface includes a co-host control.

In 302, the first terminal sends a co-hosting request to a server in response to a trigger operation on the co-host control, wherein the co-hosting request is configured to request co-hosting with a target user account for co-hosting.

In 303, the first terminal acquires a first live data stream using the target live streaming tool in response to the co-hosting success information from the server, wherein the first live data stream corresponds to the target user account.

In 304, the first terminal displays, in the live streaming interface, a live streaming picture of the live streaming account and a live streaming picture of the target user account based on a second live data stream and first live data stream, wherein the second live data stream corresponds to the live streaming account.

In the solution according to this embodiment of the present disclosure, a co-host control is provided in a live streaming interface of a live streaming room which is created using a stream push function of a target live streaming tool, and a live streaming account can send a co-hosting request to a target user account by triggering the co-host control; in the case that the target user account grants the co-hosting request, the live streaming account acquires a first live data stream of the target user account from a server using the target live streaming tool, thereby performing live streaming based on a second live data stream of the live streaming account and the first live data stream of the target user account, and implementing the co-hosting in live streaming. The live streaming account does not need to push two live data streams, and co-hosting live streaming can be implemented even in the case that the live streaming account is under poor network conditions, thereby improving the live streaming effect.

In some embodiments, sending the co-hosting request to the server includes:

displaying at least one user account for co-hosting in the live streaming interface;

determining, in response to a selection operation on any user account in the at least one user account, a selected user account as the target user account; and sending the co-hosting request to the server, the co-hosting request being generated based on the target user account.

In some embodiments, the method further includes:

acquiring an associated account in an online state among associated accounts of the live streaming account and a viewer account in the live streaming room; and determining the at least one user account based on the associated account and the viewer account.

In some embodiments, acquiring the first live data stream using the target live streaming tool includes:

sending a first data acquisition request to the server, the first data acquisition request being configured to acquire the first live data stream; and receiving the first live data stream from the server using the target live streaming tool.

In some embodiments, displaying, in the live streaming interface, the live streaming picture of the live streaming account and the live streaming picture of the target user account based on the second live data stream and the first live data stream includes:

displaying a first live streaming window and a second live streaming window in the live streaming interface; and displaying, based on the second live data stream and the first live data stream, the live streaming picture of the live streaming account and the live streaming picture of the target user account in the first live streaming window and the second live streaming window respectively.

In some embodiments, the method further includes:

displaying first prompt information in the live streaming interface in response to receiving co-hosting failure information from the server, the first prompt information being configured to indicate that the target user account rejects co-hosting.

In some embodiments, the live streaming interface further includes a co-hosting termination control; and the method further includes:

sending a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop acquiring the live data stream of each other; and stopping acquiring the first live data stream in response to receiving the co-hosting termination information from the server.

Figure 4:
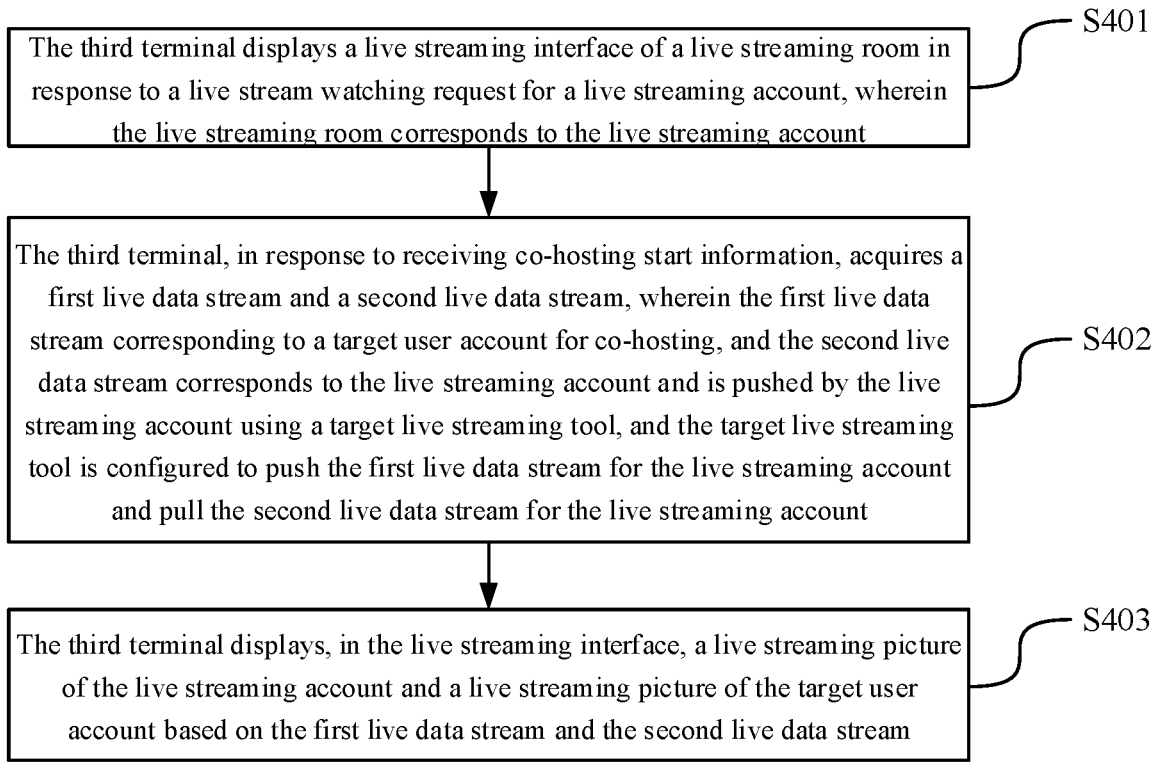
FIG. 4 is a flowchart of a method for co-hosting in live streaming according to an exemplary embodiment.

FIG. 4 is a flowchart of a method for co-hosting in live streaming according to an exemplary embodiment. Referring to FIG. 4, the method is applicable to a terminal corresponding to a viewer account, that is, the third terminal, and includes the following processes.

In 401, the third terminal displays a live streaming interface of a live streaming room in response to a live stream watching request for a live streaming account, wherein the live streaming room corresponds to the live streaming account.

In 402, the third terminal, in response to receiving co-hosting start information, acquires a first live data stream and a second live data stream, wherein the first live data stream corresponding to a target user account for co-hosting, and the second live data stream corresponds to the live streaming account and is pushed by the live streaming account using a target live streaming tool. The target live streaming tool is configured to push the second live data stream for the live streaming account and pull the first live data stream for the live streaming account.

In 403, the third terminal displays, in the live streaming interface, a live streaming picture of the live streaming account and a live streaming picture of the target user account based on the first live data stream and the second live data stream.

In the solution according to this embodiment of the present disclosure, in the case that a live stream watching request for the live streaming account is received, a live streaming picture of a live streaming room corresponding to a live streaming account is displayed, and in the case that co-hosting start information is received from a server, a second live data stream pushed by the live streaming account using a target live streaming tool and a first live data stream of the target user account are acquired, thereby displaying the two live data streams in the live streaming interface simultaneously, and thus implementing the co-hosting in live streaming. The live streaming account does not need to push two live data streams, and co-hosting live streaming can be implemented even in the case that the live streaming account is under poor network conditions, thereby improving the live streaming effect.

In some embodiments, acquiring the first live data stream and the second live data stream includes:

sending a third data acquisition request to the server, the third data acquisition request being configured to acquire the first live data stream and the second live data stream; and receiving the first live data stream and the second live data stream from the server.

In some embodiments, the method further includes:

stopping acquiring the first live data stream in response to receiving co-hosting termination information from the server.

Figure 5:
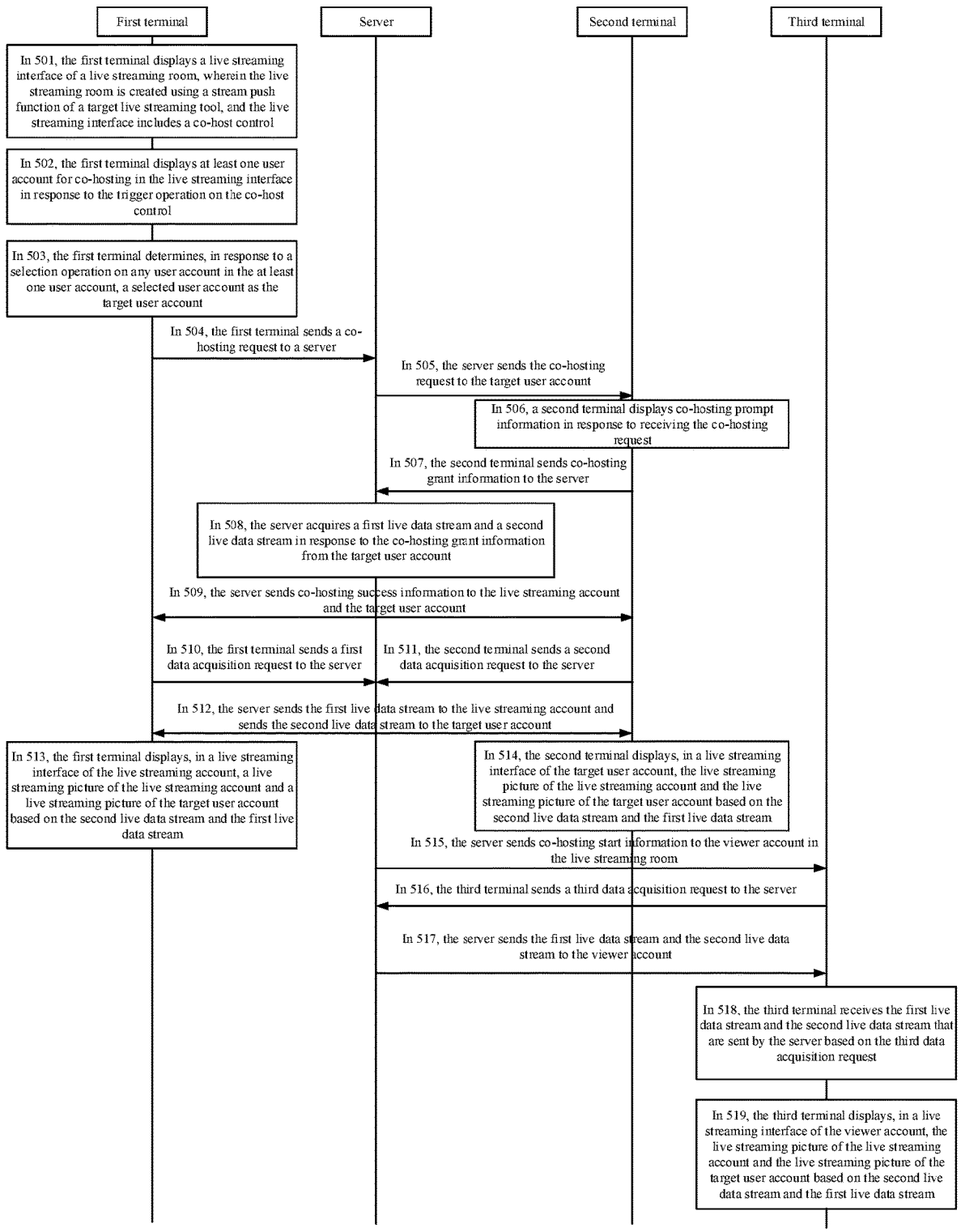
FIG. 5 is a flowchart of a method for co-hosting in live streaming according to an exemplary embodiment.

FIG. 5 is a flowchart of a method for co-hosting in live streaming according to an exemplary embodiment. Referring to FIG. 5, the method is applicable to the first terminal, and includes the following processes:

In 501, the first terminal displays a live streaming interface of a live streaming room, wherein the live streaming room is created using a stream push function of a target live streaming tool, and the live streaming interface includes a co-host control.

It should be noted that, the first terminal is a terminal used by a live streaming account (i.e., an anchor account). The live streaming account accesses a web page for live streaming by using the first terminal, wherein the web page includes a live streaming start control. An anchor triggers the live streaming start control, and the first terminal sends a live streaming room creation request to a server in response to the trigger operation on the live-streaming start control. The server creates the corresponding live streaming room for the anchor in response to receiving the live streaming room creation request, and returns creation success information to the first terminal. The first terminal acquires audio and video data of the anchor via a camera assembly in response to receiving the creation success information from the server, and sends the acquired audio and video data as a live data stream of the live streaming account to the server using the target live streaming tool (i.e., third-party live streaming tool).

The target live streaming tool is Open Broadcaster Software (OBS). In some embodiments, the target live streaming tool is of other types, which are not limited in the embodiments of the present disclosure.

In some embodiments, the first terminal displays, based on the audio and video data acquired by the camera assembly, the live streaming interface of the live streaming room, and plays a live streaming picture of the anchor in the live streaming interface based on the acquired audio and video data, wherein the live streaming room is created using the stream push function of the target live streaming tool.

It should be noted that, the live streaming interface includes a co-host control, and the co-host control is set on the live streaming interface, such that the anchor implements co-hosting with other users by triggering the co-host control, thereby enriching the live streaming forms of the live streaming room and improving the live streaming experience of the anchor and the watching experience of the users.

In 502, the first terminal displays at least one user account for co-hosting in the live streaming interface in response to the trigger operation on the co-host control.

The at least one user account includes an associated account in an online state among associated accounts of the live streaming account and a viewer account in the live streaming room.

In some embodiments, the first terminal sends an account acquisition request to the server in response to the anchor's trigger operation on the co-host control. In response to receiving the account acquisition request, the server acquires, according to an account association relationship of the live streaming account, an associated account currently in an online state among the associated accounts of the live streaming account, acquires a viewer account in the live streaming room as at least one user account capable of joining the co-hosting with the live streaming account, and further sends the acquired at least one user account to the first terminal. The first terminal displays the at least one user account in the live streaming interface in response to receiving the at least one user account, such that the anchor selects a user account for co-hosting.

The at least one user account corresponds to one of the following live streaming types: live streaming based on a web page, live streaming by a live streaming client, or live streaming by a live streaming assistant client (such as a live streaming partner). In some embodiments, the at least one user account corresponds to other live streaming types, which are not limited in the embodiments of the present disclosure. In response to acquiring the at least one user account, the server stores the acquired at least one user account in the form of a data table, such that the at least one user account can be sent conveniently. In some embodiments, the at least one user account is sent in other forms, which are not limited in the embodiments of the present disclosure.

In some embodiments, in response to acquiring the at least one user account, the server detects the at least one user account to remove any user account that does not meet a co-hosting condition in the at least one user account, thereby filtering the user accounts for co-hosting and ensuring that all the user accounts finally sent to the first terminal are capable of implementing co-hosting live streaming, and improving the success rate of the co-hosting live streaming and improving the live streaming experience of the anchor. The co-hosting condition is that a web page or client version corresponding to the live streaming type corresponding to the user account meets a target condition, the user account is a legitimate user account (e.g., no vulgar remarks or unreasonable remarks are posted), and so on, or the co-hosting condition is of other types, which are not limited in the embodiments of the present disclosure.

It should be noted that in the process of displaying the at least one user account in the live streaming interface, the first terminal displays an account display area, and then the at least one user account is displayed in the account display area, wherein the account display area partially covers the live streaming interface. In some embodiments, the first terminal is redirected from the live streaming interface to an account display interface to display the at least one user account in the account display interface. The embodiments of the present disclosure do not limit the fashion of displaying the at least one user account.

Figure 6:
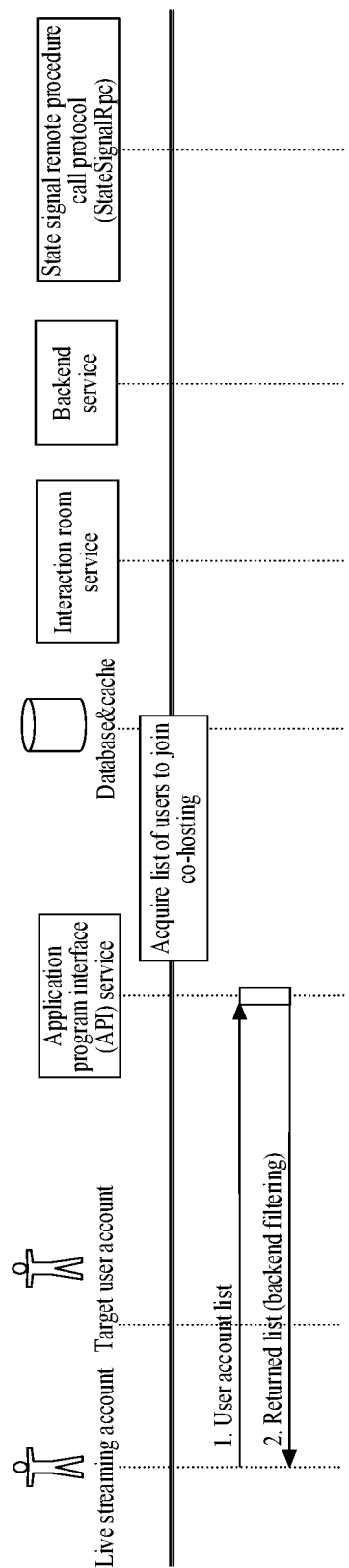
FIG. 6 is a flowchart of acquiring a list of users to join the co-hosting according to an exemplary embodiment.

It should be noted that the process in which the first terminal acquires the at least one user account from the server is realized via an application program interface (API) service provided by the server. Referring to FIG. 6, FIG. 6 is a flowchart of acquiring a list of users to join the co-hosting according to an exemplary embodiment. The live streaming account sends an account acquisition request to the server, to acquire at least one user account capable of joining the co-hosting with the live streaming account, wherein the at least one user account is fed back in the form of list. The server acquires, via the API service, an associated account currently in an online state among associated accounts of the live streaming account and a viewer account in the live streaming room, and filters the acquired user accounts to remove any user account that does not meet the co-hosting condition among the user accounts, thereby obtaining an account list consisting of the user accounts capable of joining the co-hosting and sending the list to the live streaming account.

In 503, the first terminal determines, in response to a selection operation on any user account in the at least one user account, a selected user account as the target user account.

In some embodiments, the anchor views the at least one user account displayed on the first terminal, and selects a user account with which a co-hosting is to be established. The first terminal determines the selected user account as the target user account in response to the selection operation of the user.

In 504, the first terminal sends a co-hosting request to a server, wherein the co-hosting request is generated based on the target user account, and the co-hosting request is generated based on a trigger operation on the co-host control.

In some embodiments, the first terminal generates a co-hosting request based on the target user account, wherein the co-hosting request carries the target user account, and then the co-hosting request is sent to the server.

By 502 to 504 described above, in the case that the co-host control is triggered, the first terminal is capable of displaying at least one user account capable of joining the co-hosting, for the live streaming account to choose therefrom. Then, in the case that any user account is selected, the co-hosting request is sent to the server based on the selected user account, to implement the co-hosting with the user account.

In 505, the server sends the co-hosting request to the target user account in response to receiving the co-hosting request.

In some embodiments, in response to receiving the co-hosting request, the server sends the co-hosting request to the target user account in response to the target user account carried in the co-hosting request. In the embodiments of the present disclosure, a sending operation from by the server to the target user account means the sending operation from the server to the second terminal corresponding to the target user account. For example, in this process, the server sends the co-hosting request to the second terminal in response to the co-hosting request.

Figure 7:
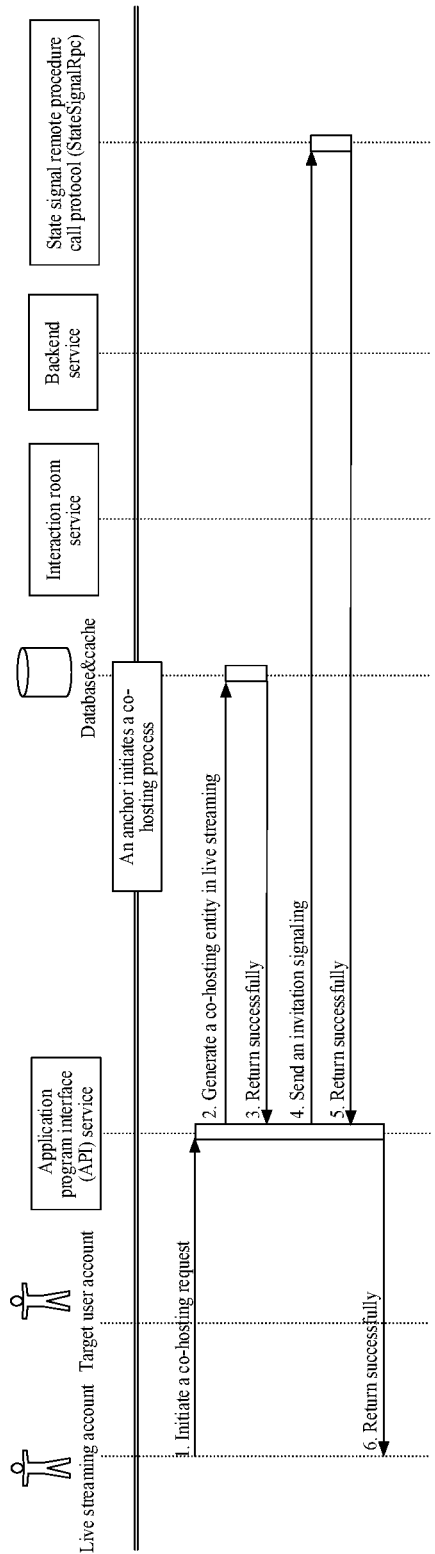
FIG. 7 is a flowchart of an anchor-initiated co-hosting process according to an exemplary embodiment.

It should be noted that, the processes of 503 to 505 described above is implemented using the API service provided by the server, a database and cache, and a state signal remote procedure call protocol (StateSignalRpc). Referring to FIG. 7, FIG. 7 is a flowchart of an implementation of an anchor-initiated co-hosting process according to an exemplary embodiment. The first terminal corresponding to the live streaming account sends a co-hosting request to the server, and sends a request for generating a co-hosting entity in live streaming to the database and cache via the API service, wherein a state of the co-hosting entity in live streaming is configured to indicate a progress of the co-hosting in live streaming, and a current state of the co-hosting entity in live streaming is a non-co-hosting state. In response to generating the co-hosting entity in live streaming, the database and cache return generation success information to the API service. In response to receiving the generation success information, the API service of the server sends a co-hosting request to the target user account via StateSignalRpc, and in the case that the co-hosting request is sent, sending success information is returned to the API service. Further, the API service returns the sending success information to the first terminal, to inform the first terminal that the target user account has received the co-hosting request.

In 506, a second terminal displays co-hosting prompt information in response to receiving the co-hosting request.

It should be noted that, the second terminal is a terminal corresponding to the target user account. In some embodiments, the target user account performs live streaming based on the live streaming client by using the second terminal, or performs live streaming based on a live streaming assistant client, or performs live streaming based on a web page, which is not limited in the embodiments of the present disclosure.

The co-hosting prompt information includes text prompt content, a grant control, and a rejection control. For example, the text prompt content is "user xx invites you to join co-hosting," and the grant control and the rejection control are a grant button and a rejection button. In some embodiments, the co-hosting prompt information includes other content. The content of the co-hosting prompt information and the specific form of each part of the content are not limited in the embodiments of the present disclosure.

In 507, the second terminal sends co-hosting grant information to the server in response to a grant operation on the co-hosting prompt information.

In some embodiments, in the case that the user corresponding to the target user account granting joining of the co-hosting with the anchor, the user corresponding to the target user account triggers the grant control to trigger the grant operation. The second terminal sends co-hosting grant information to the server in response to the grant operation of the target user account.

It should be noted that, the second terminal acquires audio and video data of the target user account via a camera assembly in response to the grant operation of the target user account, and sends the acquired audio and video data as the live data stream of the target user account to the server. For ease of description, the live data stream of the target user account is referred to as a first live data stream.

Figure 8:
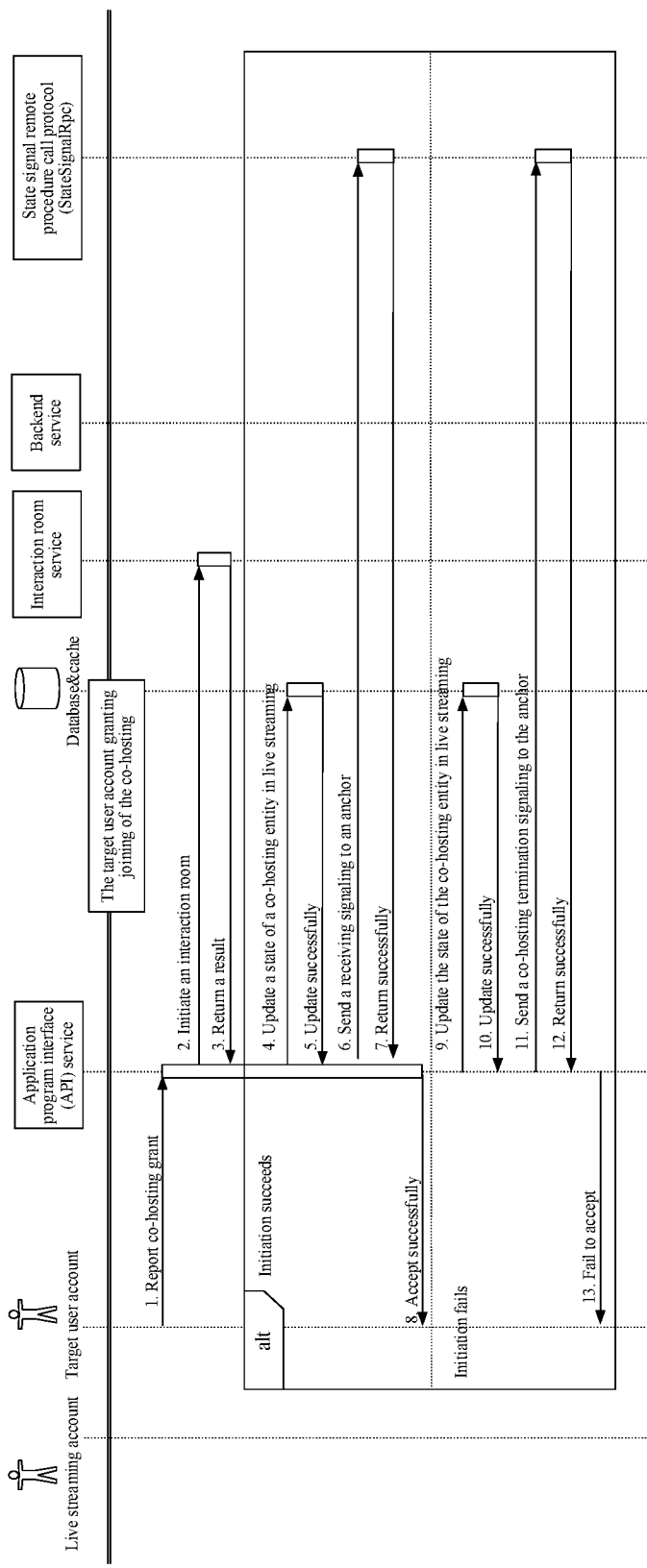
FIG. 8 is a flowchart of granting joining of the co-hosting by a target user account according to an exemplary embodiment.

In the case that the target user account grants the co-hosting, the target user account's processing for the co-hosting request is implemented via the API service provided by the server, the database and cache, and StateSignalRpc. Refer to FIG. 8 for the implementation process. FIG. 8 is a flowchart of granting joining of the co-hosting by a target user account according to an exemplary embodiment. In response to the grant operation of the target user account, the second terminal reports co-hosting grant to the API service of the server. The API service initiates an interaction room for the live streaming account and the target user account in response to the target user account granting joining of the co-hosting, to allocate an interaction room service to the live streaming account and the target user account. In the case that corresponding resources are allocated to the live streaming account and the target user account, the interaction room service reports an allocation result to the API service. In the case that resource allocation is successful, the API service sends an update request to the database and cache based on the received result. The database and cache update the state of the co-hosting entity in live streaming to be a co-hosting state, and return update success information to the API service. The API service sends an acceptance signaling to the live streaming account via StateSignalRpc in response to receiving the update success information, and returns sending success information to the API service in response to sending the acceptance signaling, such that the API service returns acceptance success information to the second terminal corresponding to the target user account in response to receiving the sending success information, to indicate that the target user account has successfully received the co-hosting request from the live streaming account. In the case that the resource allocation fails, the API service sends an update request to the database and cache based on to the received result. The database and cache update the state of the co-hosting entity in live streaming to be a co-hosting failure state, and return update success information to the API service. The API service sends a co-hosting termination signaling to the live streaming account via StateSignalRpc in response to receiving the update success information, and returns sending success information to the API service in response to sending the co-hosting termination signaling, such that the API service returns acceptance failure information to the second terminal corresponding to the target user account in response to receiving sending success information, to indicate that the target user account does not receive the co-hosting request from the live streaming account.

In some other embodiments, in the case that the user corresponding to the target user account rejects the co-hosting with the anchor, the user corresponding to the target user account triggers the rejection control, to trigger a rejection operation. The second terminal sends co-hosting rejection information to the server in response to the rejection operation of the target user account.

Figure 9:
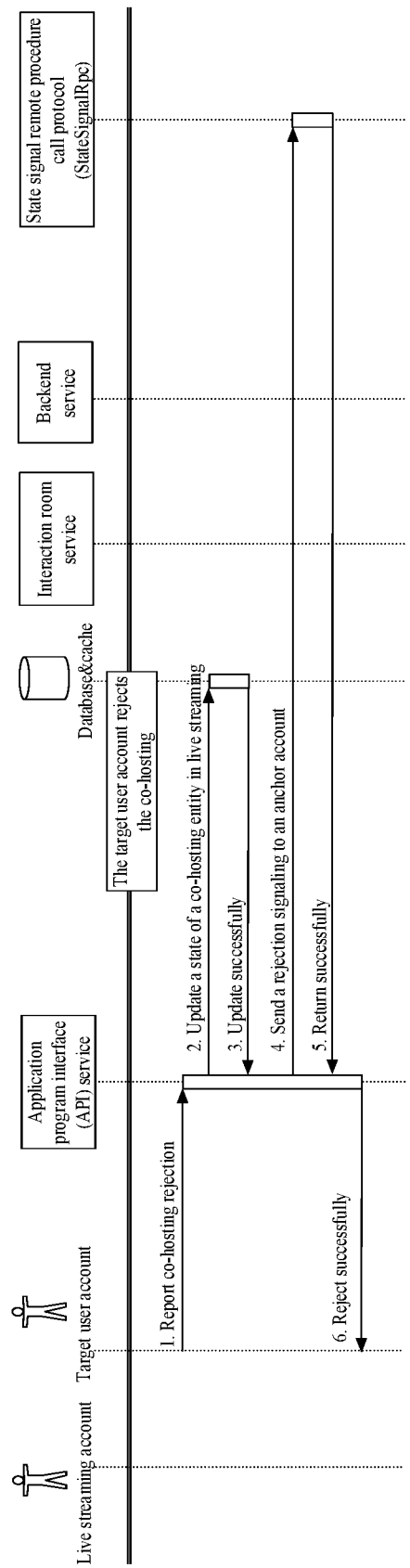
FIG. 9 is a flowchart of rejecting the co-hosting by a target user account according to an exemplary embodiment.

It should be noted that in the case that the target user account rejects the co-hosting, the target user account's processing for the co-hosting request is implemented via the API service provided by the server, the database and cache, and StateSignalRpc. Refer to FIG. 9 for the implementation process. FIG. 9 is a flowchart of rejecting the co-hosting by a target user account according to an exemplary embodiment. The second terminal reports co-hosting rejection to the API service of the server in response to the rejection operation of the target user account. The API service sends an update request to the database and cache in response to the target user account rejecting the co-hosting. The database and cache update the state of the co-hosting entity in live streaming to be a co-hosting failed state, and return update success information to the API service. The API service sends a rejection signaling to the live streaming account via StateSignalRpc in response to receiving the update success information, and returns sending success information to the API service in response to sending the rejection signaling, such that the API service returns rejection success information to the second terminal corresponding to the target user account based on the received sending success information, to indicate that the target user account has successfully rejected the co-hosting request of the live streaming account.

In 508, the server acquires the first live data stream and a second live data stream, wherein the first live data stream corresponds to the target user account, and the second live data stream corresponds to the live streaming account and is pushed by the live streaming account using a target live streaming tool. The target live streaming tool is configured to push the second live data stream for the live streaming account and pull the first live data stream for the live streaming account.

It should be noted that, in the case that the second terminal sends the co-hosting rejection information to the server in 507, the server sends co-hosting failure information to the first terminal corresponding to the live streaming account in response to receiving the co-hosting rejection information, such that the first terminal displays first prompt information in the live streaming interface of the live streaming account in response to receiving the co-hosting failure information. The first prompt information is configured to indicate that the target user account rejects the co-hosting, that is, prompting details about a co-hosting progress of the target user account, such that the live streaming account learns in time that the target user account rejects the co-hosting, to allow the live streaming account to continue the subsequent live streaming based on such a case, thereby ensuring smooth live streaming.

In 509, the server sends co-hosting success information to the live streaming account and the target user account.

The co-hosting success information is a co-hosting signaling, or the co-hosting success information is of other types, which are not limited in the embodiments of the present disclosure. The co-hosting success information is sent to the live streaming account and the target user account, to inform the live streaming account and the target user account that co-hosting is to be implemented.

In some embodiment, the server sends different co-hosting success information to the live streaming account and the target user account. That is, the server sends first co-hosting success information to the live streaming account, wherein the first co-hosting success information is configured to instruct the live streaming account acquires the first live data stream; and the server sends second co-hosting success information to the target user account, wherein the second co-hosting success information is configured to instruct the target user account to acquire the second live data stream.

In the embodiments of the present disclosure, a sending operation from the server to the live streaming account means a sending operation from the server to the first terminal corresponding to the live streaming account.

Figure 10:
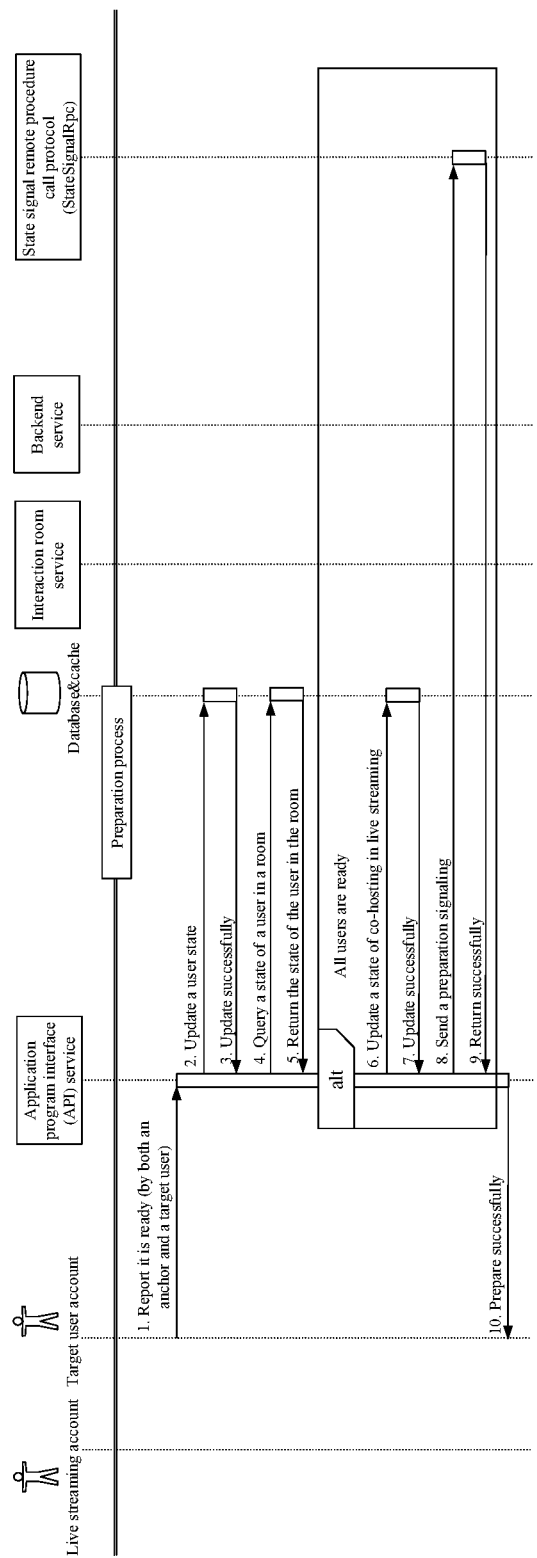
FIG. 10 is a flowchart of a preparation process according to an exemplary embodiment.

It should be noted that, before the server sends the co-hosting success information to the live streaming account and the target user account, the preparation process of determining whether the live streaming account and the target user account are ready for the co-hosting is implemented by the API service provided by the server, the database and cache, the interaction room service, and StateSignalRpc. Refer to FIG. 10 for the preparation process. FIG. 10 is a flowchart of a preparation process according to an exemplary embodiment. The live streaming account and the target user account separately report to the API service to indicate whether they are ready. The API service sends a state update request to the interaction room service in response to receiving the report result. The interaction room service updates user states of the live streaming account and the target user account in response to receiving the state update request, and returns update success information to the API service upon completion of the updating. The API service sends a query request to the interaction room service in response to receiving the update success information, to query the user states of the live streaming account and the target user account. The interaction room service returns the user states of the live streaming account and the target user account to the API service in response to receiving the query request. If the live streaming account and the target user account are ready, the API service sends an update request to the database and cache. The database and cache update the state of the co-hosting entity in live streaming to be a co-hosting ready state, and return update success information to the API service. The API service sends a preparation signaling to the live streaming account and the target user account via StateSignalRpc in response to receiving the update success information, and returns sending success information to the API service in response to sending the preparation signaling, such that the API service returns preparation success information to the first terminal corresponding to the live streaming account and the second terminal corresponding to the target user account based on the received sending success information, to inform the live streaming account and the target user account that co-hosting is to be implemented.

In some embodiments, in the case that the first terminal sends the co-hosting request to the server, second prompt information is displayed in the live streaming interface of the first terminal, wherein the second prompt information is configured to indicate that the co-hosting with the target user account is ongoing, such that the on-going co-hosting is prompted via the second prompt information. The second prompt information includes text prompt content and a cancel control. For example, the text prompt content is "waiting for the user xx to grant," and the cancel control is a cancel button, or the text prompt content and the cancel control are of other types, which are not limited in the embodiments of the present disclosure. In the process of waiting for the target user account to grant, the live streaming account can trigger the cancel control at any time, to cancel the co-hosting with the target user account. The first terminal sends a co-hosting cancellation request to the server in response to the live streaming account's trigger operation on the cancel control. The server sends the received co-hosting cancellation request to the second terminal. The second terminal displays third prompt information on the live streaming interface of the target user account in response to receiving the co-hosting cancellation request. The third prompt information is configured to indicate that the live streaming account cancels the co-hosting, such that the cancellation of the co-hosting is prompt via the third prompt information.

Figure 11:
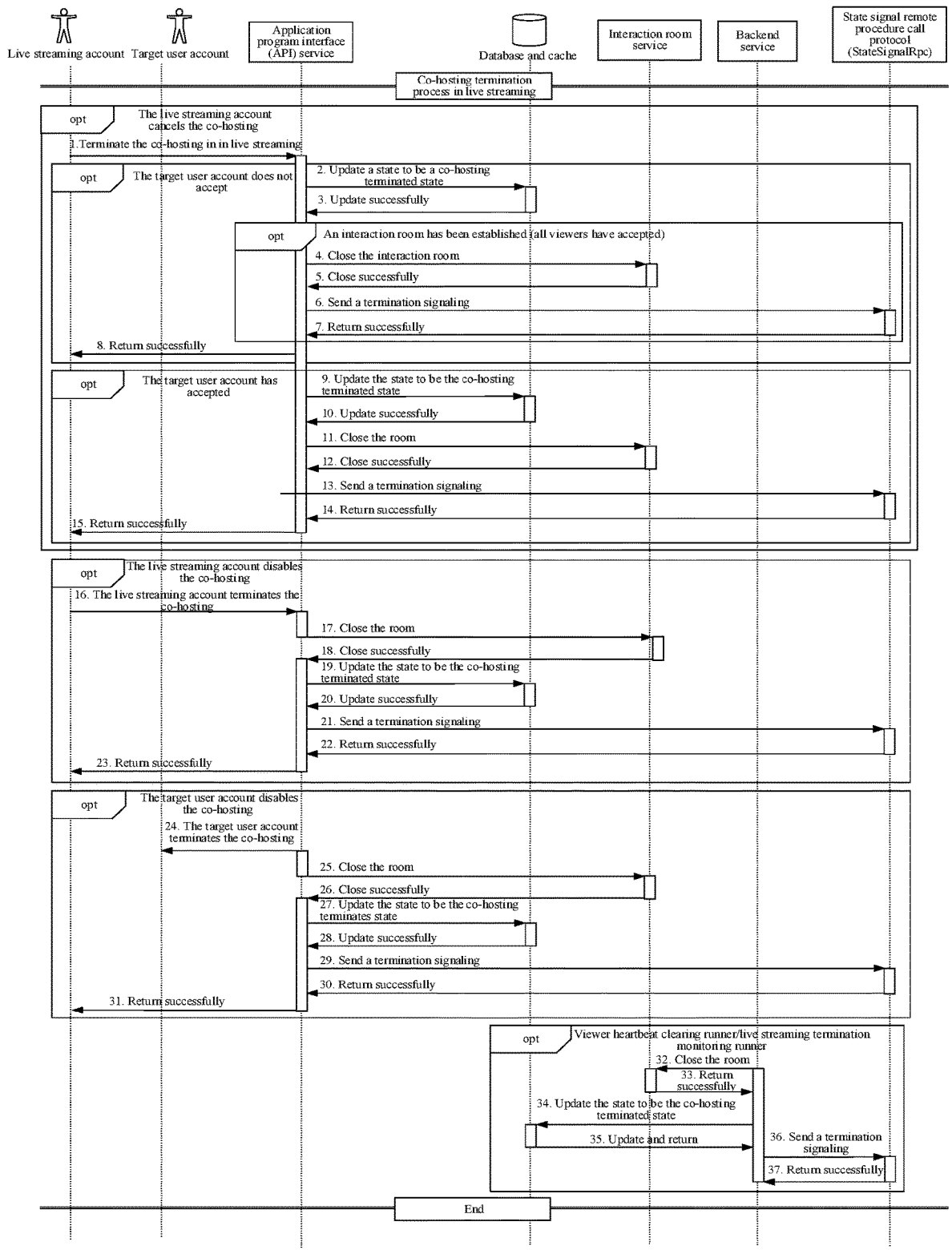
FIG. 11 is a flowchart of a process of terminating co-hosting in live streaming according to an exemplary embodiment.

As the interactions between the first terminal and the second terminal, and the server takes some time, in the case that the second terminal receives the co-hosting cancellation request, it is possible that the target user account has not operated the co-hosting prompt information yet, or has granted the co-hosting prompt information. The following separately describes how to terminate the co-hosting in live streaming in the two cases. Referring to FIG. 11, FIG. 11 is a flowchart of a process of terminating co-hosting in live streaming according to an exemplary embodiment. The server implements the co-hosting cancellation process of the live streaming account via the API service, the database and cache, the interaction room service, and StateSignalRpc.

In the case that the target user account has not operated the co-hosting prompt information yet, the first terminal sends a co-hosting cancellation request to the API service of the server. The API service sends an update request to the database and cache in response to receiving the co-hosting cancellation request. The database and cache update the state of the co-hosting entity in live streaming to be a co-hosting terminated state, and returns update success information to the API service. The API service sends a room closing request to the interaction room service in response to receiving the update success information. In response to the room closing request, the interaction room service reclaims service resources allocated to the live streaming account and the target user account, to close the interaction room of the live streaming account and the target user account, and then returns closing success information to the API service. The API service sends a termination signaling to the target user account via StateSignalRpc based on the received closing success information, and returns sending success information to the API service in response to sending the termination signaling, such that the API service returns cancellation success information to the first terminal corresponding to the live streaming account based on the received sending success information, to prompt the live streaming account that the co-hosting with the target user account has been canceled successfully. In the case that the target user account has granted the co-hosting prompt information, the co-hosting between the live streaming account and the target user account is canceled by processes similar to the foregoing processes. For the specific process, reference may be made to the above process, which is not described herein again.

In 510, the first terminal sends a first data acquisition request to the server in response to receiving the co-hosting success information, wherein the first data acquisition request is configured to acquire the first live data stream.

The first terminal sends the first data acquisition request to the server, and thus acquires the first live data stream, thereby implementing the co-hosting between the live streaming account and the target user account.

In 511, the second terminal sends a second data acquisition request to the server in response to receiving the co-hosting success information, wherein the second data acquisition request is configured to acquire the second live data stream.

The second live data stream is pushed by the live streaming account using the target live streaming tool.

It should be noted that, the sequence indicated by 510 and 511 does not limit the sequence of performing the two processes. In some embodiments, 510 may be performed before 511, or 511 is performed before 510, or 510 and 511 are performed simultaneously, which is not limited in the embodiments of the present disclosure.

In 512, the server sends the first live data stream to the live streaming account and sends the second live data stream to the target user account in response to receiving the first data acquisition request and the second data acquisition request.

It should be noted that, the server sends the first live data stream to the live streaming account in response to receiving the first data acquisition request, and sends the second live data stream to the target user account in response to receiving the second data acquisition request. The server sends the live data stream by sending address information. That is, the sever sends first address information to the live streaming account, wherein the first address information is cache address information of the live data stream, and the first terminal pulls the first live data stream from a content delivery network (CDN) based on the first address information. The server sends second address information to the target user account, wherein the second address information is cache address information of the second live data stream, and the second terminal pulls the second live data stream from the CDN based on the second address information.

The first live data stream is sent to the live streaming account, and the second live data stream is sent to the target user account, such that the target user account and the live streaming account can pull the data streams of each other, thereby implementing the co-hosting between the live streaming account and the target user account.

In 513, the first terminal receives the first live data stream from the server, and displays, in a live streaming interface of the live streaming account, a live streaming picture of the live streaming account and a live streaming picture of the target user account based on the second live data stream and the first live data stream.

In some embodiments, the first terminal displays a first live streaming window and a second live streaming window in the live streaming interface of the live streaming account, and displays, based on the second live data stream and the first live data stream, the live streaming picture of the live streaming account and the live streaming picture of the target user account in the first live streaming window and the second live streaming window respectively. The first live streaming window and the second live streaming window are displayed side by side in the live streaming interface, or displayed in any arrangement in the live streaming interface.

By displaying the live streaming pictures of the live streaming account and the target user account in different live streaming windows of the live streaming interface, co-hosting live streaming between the live streaming account and the target user account is implemented.

It should be noted that, the live streaming interface of the live streaming account further includes a viewer discussion area. In some embodiments, the viewer discussion area is displayed side by side with the first live streaming window and the second live streaming window, or the viewer discussion area is located below the first live streaming window and the second live streaming window. The position of the viewer discussion area is not limited in the embodiments of the present disclosure. The viewer discussion area is provided to make it convenient for the user account watching the live streaming to enter text in the viewer discussion area to communicate with the anchor or other viewers, thereby implementing interactions between the anchor and anchors and improving the watching experience of the viewers.

In 514, the second terminal receives the second live data stream from the server, and displays, in a live streaming interface of the target user account, the live streaming picture of the live streaming account and the live streaming picture of the target user account based on the second live data stream and the first live data stream.

514 is similar to 513 above, which is not described in detail again herein.

It should be noted that, the sequence indicated by 513 and 514 does not limit the sequence of performing the two processes. In some embodiments, 513 may be performed before 514, or 514 is performed before 513, or 513 and 514 are performed simultaneously, which is not limited in the embodiments of the present disclosure.

In 515, the server sends co-hosting start information to the viewer account in the live streaming room, wherein the co-hosting start information is configured to instruct the viewer account to acquire the first live data stream and the second live data stream.

The co-hosting start information is sent to the viewer account, such that the viewer account acquires that the live streaming account and the target user account is going to start co-hosting live streaming, and hence the viewer account pulls the first live data stream and the second live stream by sending a data acquisition request to the server.

In the embodiments of the present disclosure, a sending operation from the server to the viewer account refers to the sending operation from the server to the third terminal corresponding to the viewer account.

In 516, the third terminal sends a third data acquisition request to the server in response to receiving the co-hosting start information, wherein the third data acquisition request is configured to acquire the first live data stream and the second live data stream.

It should be noted that, the third second terminal is a terminal used by the viewer account. In some embodiments, the viewer account watches live streaming based on a live streaming client on the third terminal, or watches live streaming via a web page on the third terminal, which is not limited in the embodiments of the present disclosure.

The third data acquisition request is sent to the server in the case that the co-hosting start information is received, and thus the first live data stream and the second live data stream are acquired, such that live streaming is performed based on the first live data stream and the second live data stream, thereby implementing the co-hosting in live streaming.

In 517, the server sends the first live data stream and the second live data stream to the viewer account in response to receiving the third data acquisition request.

In 518, the third terminal receives the first live data stream and the second live data stream that are sent by the server based on the third data acquisition request.

In response receiving the third data acquisition request from the viewer account, the server directly sends the first live data stream and the second live data stream to the viewer account, and in response to receiving the two live data streams, the third terminal corresponding to the viewer account displays the live streaming pictures of the two accounts.

In 519, the third terminal displays, in a live streaming interface of the viewer account, the live streaming picture of the live streaming account and the live streaming picture of the target user account based on the second live data stream and the first live data stream.

It should be noted that, the live streaming picture of the live streaming account and the live streaming picture of the target user account are displayed on the live streaming interface of the third terminal corresponding to the viewer account simultaneously, the viewer can watch the co-hosting live streaming of the live streaming account and the target user account. The display process is similar to 513, which is not described in detail herein again.

It should be noted that, the sequence indicated by 515 to 519 does not limit the sequence of performing 515 to 519. In some embodiments, the server may perform 515 to 519 at any time in response to performing 508, and the timing for performing 515 to 519 is not limited in the embodiments of the present disclosure.

It should be noted that, in the co-hosting live streaming process of the live streaming account and the target user account, the live streaming interface of the live streaming account and the live streaming interface of the target user account both include a co-hosting termination control. The live streaming account and the target user account can terminate the co-hosting live streaming by triggering the co-hosting termination controls in the respective live streaming interfaces. The co-hosting termination control is provided in the live streaming interface of the live streaming account, such that the live streaming account can terminate the process of co-hosting live streaming by triggering the co-hosting termination control, thereby improving the live streaming efficiency, and further improving an anchor's live streaming experience.

In some embodiments, the anchor corresponding to the live streaming account triggers the co-hosting termination control in the live streaming interface of the live streaming account. In response to the live streaming account's trigger operation on the co-hosting termination control, the first terminal sends a co-hosting termination request to the server. The server sends co-hosting termination information to the first terminal corresponding to the live streaming account, the second terminal corresponding to the target user account, and the third terminal corresponding to the viewer account in response to receiving the co-hosting termination request. The first terminal stops acquiring the first live data stream in response to receiving the co-hosting termination information from the server; the second terminal stops acquiring the second live data stream in response to receiving the co-hosting termination information from the server; the third terminal stops acquiring the first live data stream in response to receiving the co-hosting termination information from the server. Thus, the co-hosting live streaming is terminated.

The co-hosting termination information is sent to each account in the live streaming room in response to receiving a co-hosting termination request from any account participating in the co-hosting, such that each account can stop pulling the live data stream from the other party in response to receiving the co-hosting termination information, thereby terminating the co-hosting in live streaming.

In response to receiving the co-hosting termination information from the server, the third terminal stops acquiring the first live data stream, but only acquires the second live data stream pushed by the live streaming account using the target live streaming tool, to ensure playback of subsequent live streaming content of the anchor and ensure continuation of live streaming.

Referring to FIG. 11, the server performs the co-hosting termination process of the live streaming account via the API service, the database and cache, an interaction room service, and StateSignalRpc. The live streaming account sends a co-hosting termination request to the API service of the server. The API service sends a room closing request to the interaction room service in response to receiving the co-hosting termination request. In response to receiving the room closing request, the interaction room service reclaims service resources allocated to the live streaming account and the target user account, to close the interaction room of the live streaming account and the target user account, and then returns closing success information to the API service. The API service sends an update request to the database and cache based on the received closing success information. The database and cache update the state of the co-hosting entity in live streaming to be a co-hosting terminated state, and return update success information to the API service. The API service sends a termination signaling to the target user account via StateSignalRpc in response to receiving the update success information, and returns sending success information to the API service in response to sending the termination signaling, such that the API service returns termination success information to the first terminal corresponding to the live streaming account and the second terminal corresponding to the target user account based on the received sending success information, to notify the live streaming account and the target user account that the co-hosting with the other party has been terminated successfully.

In some other embodiments, the target user corresponding to the target user account triggers the co-hosting termination control in the live streaming interface of the target user account. The second terminal sends a co-hosting termination request to the server in response to the target user account's trigger operation on the co-hosting termination control. The server sends co-hosting termination information to the first terminal corresponding to the live streaming account and the second terminal corresponding to the target user account in response to receiving the co-hosting termination request. The first terminal stops acquiring the live data stream of the target user account in response to receiving the co-hosting termination information from the server, and the second terminal stops acquiring the live data stream of the live streaming account in response to receiving the co-hosting termination information from the server. Thus, the co-hosting live streaming is terminated.

Referring to FIG. 11, the server performs the co-hosting termination process of the target user account via the API service, the database and cache, the interaction room service, and StateSignalRpc. The target user account sends a co-hosting termination request to the API service of the server. The API service sends a room closing request to the interaction room service in response to receiving the co-hosting termination request. In response to receiving the room closing request, the interaction room service reclaims service resources allocated to the live streaming account and the target user account, to close the interaction room of the live streaming account and the target user account, and then returns closing success information to the API service. The API service sends an update request to the database and cache based on the received closing success information. The database and cache update the state of the co-hosting entity in live streaming to be a co-hosting terminated state, and return update success information to the API service. The API service sends a termination signaling to the live streaming account via StateSignalRpc in response to receiving the update success information, and returns sending success information to the API service in response to sending the termination signaling, such that the API service returns termination success information to the first terminal corresponding to the live streaming account and the second terminal corresponding to the target user account based on the received sending success information, to notify the live streaming account and the target user account that the co-hosting with the other party has been terminated successfully.

It should be noted that, in the case that either the live streaming account or the target user account terminates the co-hosting, the server monitors whether the viewer account exits from the live streaming room by clearing viewer heartbeats or listening to termination of the live streaming. Referring to FIG. 10, the server monitors, based on the database and cache, the interaction room service, the backend service, and StateSignalRpc, whether the viewer account exits from the live streaming room. The backend service sends a room closing request to the interaction room service in response to a co-hosting termination request from either the live streaming account or the target user account. In response to receiving the room closing request, the interaction room service reclaims service resources allocated to the live streaming account and the target user account, to close the interaction room of the live streaming account and the target user account, and then returns closing success information to the backend service. The backend service sends an update request to the database and cache based on the received closing success information. The database and cache update the state of the co-hosting entity in live streaming to be a co-hosting terminated state, and returns update success information to the backend service. The backend service sends a termination signaling to the viewer account via StateSignalRpc in response to receiving the update success information, to indicate that the co-hosting between the live streaming account and the target user account has been terminated, and returns sending success information to the backend service in response to sending the termination signaling. By monitoring whether the viewer account in the live streaming room exit, the server can allocate resources correspondingly in time, to improve the processing efficiency of the server.

In the solution according to this embodiment of the present disclosure, a co-host control is provided in a live streaming interface of a live streaming room, wherein the live streaming room is created using a stream push function of a target live streaming tool, and a live streaming account can send a co-hosting request to a target user account by triggering the co-host control. In response to receiving the co-hosting request, the server sends the co-hosting request to the target user account, and in response to receiving co-hosting grant information from the target user account, the server sends a first live data stream of the target user account to the live streaming account, sends a second live data stream pushed by the live streaming account using the target live streaming tool, and sends both the second live data stream pushed by the live streaming account using the target live streaming tool and the first live data stream of the target user account to a terminal corresponding to a viewer account, such that the terminal corresponding to the viewer account plays the two live data streams simultaneously, thereby implementing the co-hosting between the target user account and the live streaming account. The live streaming account does not need to push two live data streams, and co-hosting live streaming can be implemented even in the case that the live streaming account is under poor network conditions, thereby improving the live streaming effect.

Figure 12:
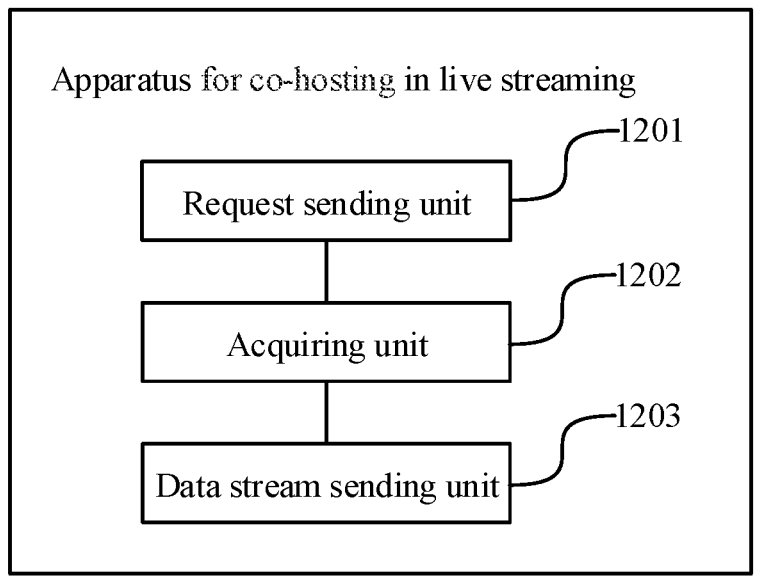
FIG. 12 is a block diagram of an apparatus for co-hosting in live streaming according to an exemplary embodiment.

FIG. 12 is a block diagram of an apparatus for co-hosting in live streaming according to an exemplary embodiment. Referring to FIG. 12, the apparatus includes:

a request sending unit 1201, configured to send a co-hosting request to a target user account in response to receiving the co-hosting request for the target user account from a live streaming account in a live streaming room;

an acquiring unit 1202, configured to acquire a first live data stream in response to receiving co-hosting grant information from the target user account, the first live data stream corresponding to the target user account;

wherein the acquiring unit 1202 is further configured to acquire a second live data stream, the second live data stream corresponding to the live streaming account, and the second live data stream being pushed by the live streaming account using a target live streaming tool, the target live streaming tool being configured to push the second live data stream for the live streaming account and pull the first live data stream for the live streaming account; and a data stream sending unit 1203, configured to send the first live data stream and the second live data stream to a viewer account in the live streaming room.

In the apparatus according to this embodiment of the present disclosure, in the case that a co-hosting request is received, the co-hosting request is sent to the target user account for co-hosting; and in the case that co-hosting grant information from the target user account is received, a second live data stream pushed by the live streaming account using a target live streaming tool and a first live data stream of the target user account are both sent to a terminal corresponding to a viewer account, such that the terminal corresponding to the viewer account plays the two live data streams simultaneously, thereby implementing the co-hosting between the target user account and the live streaming account. The live streaming account does not need to push two live data streams, and co-hosting live streaming can be implemented even in the case that the live streaming account is under poor network conditions, thereby improving the live streaming effect.

In some embodiments, the apparatus further includes:

a first information sending unit, configured to send first co-hosting success information to the live streaming account, the first co-hosting success information being configured to instruct the live streaming account to acquire the first live data stream; and the data stream sending unit 1203 is further configured to send the first live data stream to the live streaming account in response to receiving a first data acquisition request from the live streaming account.

In some embodiments, the apparatus further includes:

a second information sending unit, configured to send second co-hosting success information to the target user account, the second co-hosting success information being configured to instruct the target user account to acquire the second live data stream to the target user account; and the data stream sending unit 1203 is further configured to send the second live data stream to the target user account in response to receiving a second data acquisition request from the target user account.

In some embodiments, the apparatus further includes:

a second information sending unit, configured to send co-hosting start information to the viewer account in the live streaming room, the co-hosting start information being configured to instruct the viewer account to acquire the first live data stream and the second live data stream; and the data stream sending unit 1203 is further configured to send the first live data stream and the second live data stream to the viewer account in the live streaming room in response to receiving a third data acquisition request from the viewer account.

In some embodiments, the apparatus further includes:

a third information sending unit, configured to send co-hosting termination information to the live streaming account, the target user account, and the viewer account in response to receiving a co-hosting termination request, the co-hosting termination information being configured to instruct the live streaming account and the target user account to stop acquiring the live data stream of each other, and instruct the viewer account to stop acquiring the first live data stream, and the co-hosting termination request being triggered by either of the live streaming account or the target user account.

Figure 13:
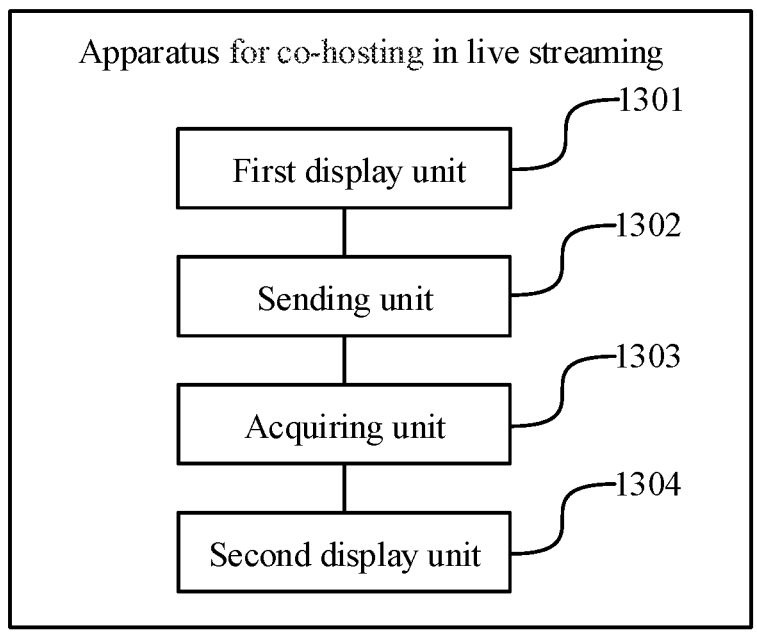
FIG. 13 is a block diagram of an apparatus for co-hosting in live streaming according to an exemplary embodiment.

FIG. 13 is a block diagram of an apparatus for co-hosting in live streaming according to an exemplary embodiment. Referring to FIG. 13, the apparatus includes:

a first display unit 1301, configured to display a live streaming interface of a live streaming room, the live streaming room being created using a stream push function of a target live streaming tool, and the live streaming interface including a co-hosting control;

a sending unit 1302, configured to send a co-hosting request to a server in response to a trigger operation on the co-hosting control, the co-hosting request being configured to request co-hosting with a target user account for co-hosting;

an acquiring unit 1303, configured to acquire a first live data stream using the target live streaming tool in response to receiving co-hosting success information from the server, the first live data stream corresponding to the target user account; and a second display unit 1304, configured to display, in the live streaming interface, a live streaming picture of the live streaming account and a live streaming picture of the target user account based on a second live data stream and the first live data stream, the second live data stream corresponding to the live streaming account.

In the apparatus according to this embodiment of the present disclosure, a co-host control is provided in a live streaming interface of a live streaming room, wherein the live streaming room is created using a stream push function of a target live streaming tool, and a live streaming account can send a co-hosting request to a target user account by triggering the co-host control; in the case that the target user account grants the co-hosting request, the live streaming account acquires a first live data stream of the target user account from a server using the target live streaming tool, thereby performing live streaming based on a second live data stream of the live streaming account and the first live data stream of the target user account, and implementing the co-hosting in live streaming. The live streaming account does not need to push two live data streams, and co-hosting live streaming can be implemented even if the live streaming account is under poor network conditions, thereby improving the live streaming effect.

In some embodiments, the sending unit 1302 is configured to display at least one user account for co-hosting in the live streaming interface; determine, in response to a selection operation on any user account in the at least one user account, a selected user account as the target user account;

and send the co-hosting request to the server, the co-hosting request being generated based on the target user account.

In some embodiments, the sending unit 1302 is further configured to acquire an associated account in an online state among associated accounts of the live streaming account and a viewer account in the live streaming room; and determine the at least one user account based on the associated account and the viewer account.

In some embodiments, the acquiring unit 1303 is configured to send a first data acquisition request to the server, the first data acquisition request being configured to acquire the first live data stream; and receive the first live data stream from the server using the target live streaming tool.

In some embodiments, the second display unit 1304 is configured to display a first live streaming window and a second live streaming window in the live streaming interface; and display, based on the second live data stream and the first live data stream, the live streaming picture of the live streaming account and the live streaming picture of the target user account in the first live streaming window and the second live streaming window respectively.

In some embodiments, the apparatus further includes:

a third display unit, configured to display first prompt information in the live streaming interface in response to receiving co-hosting failure information from the server, the first prompt information being configured to instruct the target user account to reject co-hosting.

In some embodiments, the live streaming interface includes a co-hosting termination control; and the sending unit 1302 is further configured to send a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop acquiring the live data stream of each other; and the acquiring unit 1303 is further configured to stop acquiring the first live data stream in response to receiving the co-hosting termination information from the server.

Figure 14:
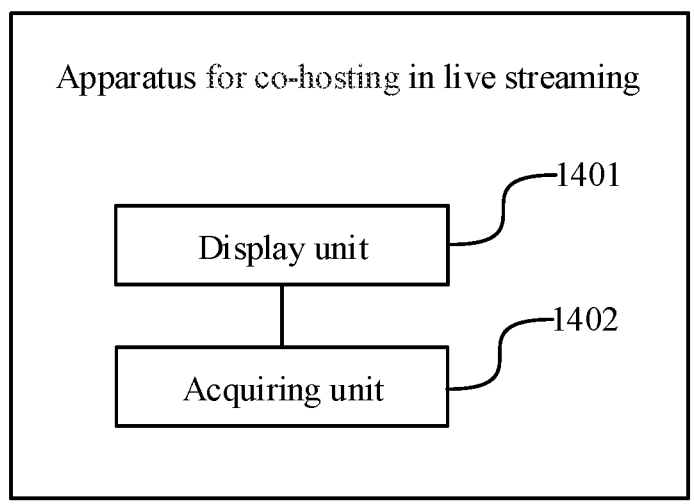
FIG. 14 is a block diagram of an apparatus for co-hosting in live streaming according to an exemplary embodiment.

FIG. 14 is a block diagram of an apparatus for co-hosting in live streaming according to an exemplary embodiment. Referring to FIG. 14, the apparatus includes:

a display unit 1401, configured to display a live streaming interface of a live streaming room in response to a live stream watching request for a live streaming account, the live streaming room corresponding to the live streaming account; and an acquiring unit 1402, configured to acquire a first live data stream and a second live data stream in response to receiving co-hosting start information from a server, the first live data stream corresponding to a target user account for co-hosting, and the second live data stream corresponding to the live streaming account, the second live data stream being pushed by the live streaming account using a target live streaming tool, the target live streaming tool being configured to push the second live data stream for the live streaming account and pull the second live data stream for the live streaming account;

wherein the display unit 1402 is further configured to display, in the live streaming interface, a live streaming picture of the live streaming account and a live streaming picture of the target user account based on the second live data stream and the second live data stream.

In the solution according to this embodiment of the present disclosure, in the case that a live stream watching request for the live streaming account is received, a live streaming picture of a live streaming room corresponding to a live streaming account is displayed; and in the case that co-hosting start information is received from a server, a second live data stream pushed by the live streaming account using a target live streaming tool and a first live data stream of the target user account are acquired, thereby displaying the two live data streams in the live streaming interface simultaneously, and thus implementing the co-hosting in live streaming. The live streaming account does not need to push two live data streams, and co-hosting live streaming can be implemented even in the case that the live streaming account is under network conditions, thereby improving the live streaming effect.

In some embodiments, the acquiring unit 1402 is further configured to send a third data acquisition request to the server, the third data acquisition request being configured to acquire the first live data stream and the second live data stream; and receive the first live data stream and the second live data stream from the server.

In some embodiments, the acquiring unit 1402 is further configured to stop acquiring the first live data stream in response to receiving the co-hosting termination information from the server.

Figure 15:
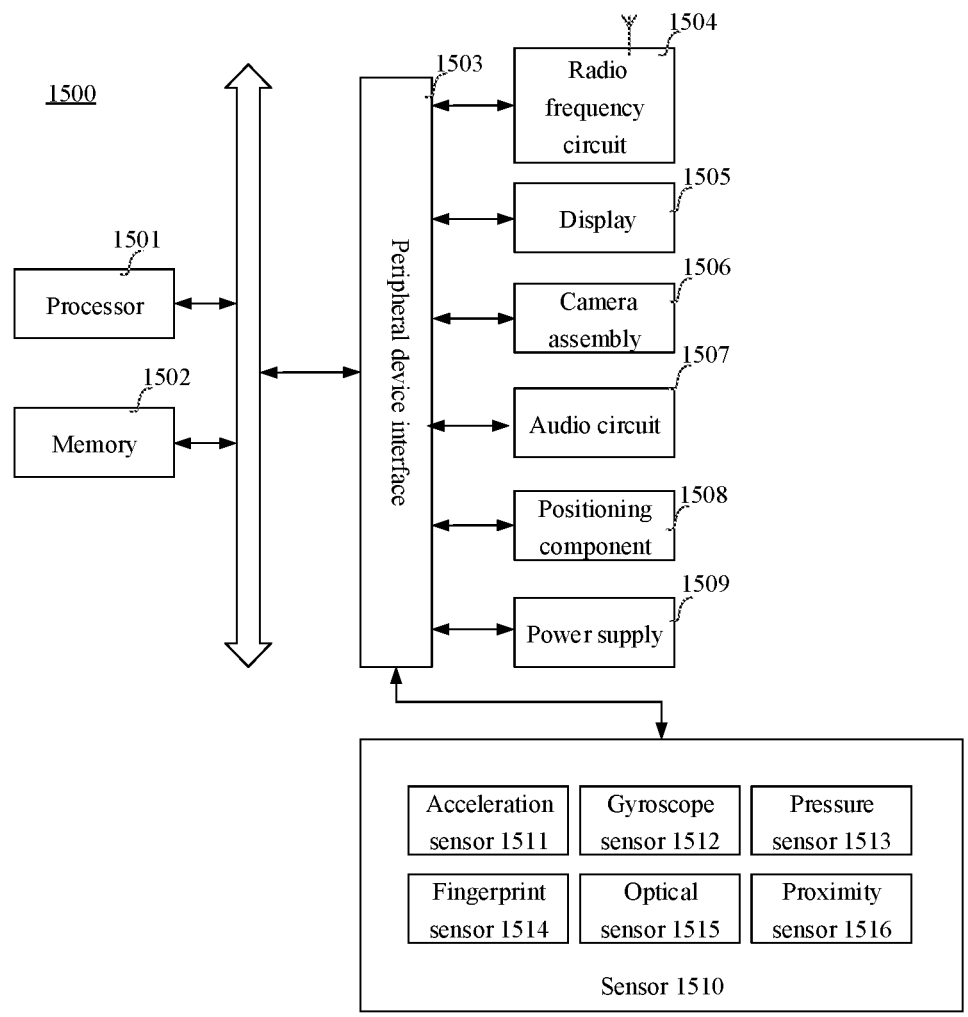
FIG. 15 is a block diagram of a terminal 1500 according to an exemplary embodiment.

FIG. 15 is a block diagram of a terminal 1500 according to an exemplary embodiment. The terminal 1500 is the first terminal, the second terminal, or the third terminal as described above. The terminal 1500 may be a smartphone, a tablet computer, a Moving Picture Experts Group Audio Layer III (MP3) player, a Moving Picture Experts Group Audio Layer IV (MP4) player, a laptop computer, or a desktop computer. The terminal 1500 may also be referred to as user equipment, a portable terminal, a laptop terminal, a desktop terminal, or the like.

Generally, the terminal 1500 includes at least one processor 1501 and at least one memory 1502.

The processor 1501 may include one or more processing cores, for example, a 4-core processor or an 8-core processor. The processor 1501 may be implemented by using at least one of the following hardware forms: digital signal processing (DSP), a field-programmable gate array (FPGA), and a programmable logic array (PLA). The processor 1501 further includes a main processor and a coprocessor. The main processor is configured to process data in an awake state, also referred to as a central processing unit (CPU), and the coprocessor is a low-power processor configured to process data in a standby state. In some embodiments, the processor 1501 may be integrated with a graphics processing unit (GPU). The GPU is configured to be responsible for rendering and drawing content that a display needs to display. In some embodiments, the processor 1501 further includes an artificial intelligence (AI) processor. The AI processor is configured to process computing operations related to machine learning.

The memory 1502 includes one or more computer-readable storage media, which may be non-transient. The memory 1502 may further include a high-speed random access memory and a non-volatile memory such as one or more magnetic disk storage devices and a flash storage device. In some embodiments, the non-transitory computer-readable storage medium in the memory 1502 is configured to store at least one program code. The at least one program code is executed by the processor 1501 to perform the method for co-hosting in live streaming according to the method embodiments of the present disclosure.

In some embodiments, the terminal 1500 may further optionally include a peripheral device interface 1503 and at least one peripheral device. The processor 1501, the memory 1502, and the peripheral device interface 1503 may be connected via a bus or a signal cable. Each peripheral device may be connected to the peripheral device interface 1503 via a bus, a signal cable, or a circuit board. In some embodiments, the peripheral device includes at least one of: a radio frequency circuit 1504, a display 1505, a camera assembly 1506, an audio circuit 1507, a positioning component 1508, and a power supply 1509.

The peripheral device interface 1503 may be configured to connect at least one peripheral device related to input/output (I/O) to the processor 1501 and the memory 1502. In some embodiments, the processor 1501, the memory 1502, and the peripheral device interface 1503 are integrated into the same chip or circuit board; in some other embodiments, any one or two of the processor 1501, the memory 1502, and the peripheral device interface 1503 may be implemented on an independent chip or circuit board. This is not limited in this embodiment.

The radio frequency circuit 1504 is configured to receive and transmit a radio frequency (RF) signal, also referred to as an electromagnetic signal. The radio frequency circuit 1504 communicates with a communications network and another communications device by using the electromagnetic signal. The radio frequency circuit 1504 may convert an electric signal into an electromagnetic signal for transmission, or convert a received electromagnetic signal into an electric signal. In some embodiments, the radio frequency circuit 1504 includes: an antenna system, an RF transceiver, one or more amplifiers, a tuner, an oscillator, a digital signal processor, a codec chip set, a subscriber identity module card, and the like. The radio frequency circuit 1504 may communicate with another terminal using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 1504 further includes a near field communication (NFC) related circuit, and is not limited in the embodiments of the present disclosure.

The display 1505 is configured to display a user interface (UI). The UI includes a graph, a text, an icon, a video, and any combination thereof. In the case that the display 1505 is a touch display, the display 1505 is further capable of acquiring a touch signal on or above a surface of the display 1505. The touch signal may be inputted as a control signal to the processor 1501 for processing. In this case, the display 1505 may be further configured to provide a virtual button and/or a virtual keyboard, which is also referred to as a soft button and/or a soft keyboard. In some embodiments, there may be one display 1505, disposed on a front panel of the terminal 1500. In some other embodiments, there may be at least two displays 1505, disposed on different surfaces of the terminal 1500 respectively or in a folded design. In still other embodiments, the display 1505 may be a flexible display, disposed on a curved surface or a folded surface of the terminal 1500. Even, the display 1505 may be further set in a non-rectangular irregular pattern, namely, a special-shaped screen. The display 1505 may be prepared by using materials such as a liquid crystal display (LDC), an organic light-emitting diode (OLED), or the like.

The camera assembly 1506 is configured to acquire an image or a video. In some embodiments, the camera assembly 1506 includes a front-facing camera and a rear-facing camera. Generally, the front-facing camera is disposed on a front panel of the terminal, and the rear-facing camera is disposed on a back surface of the terminal. In some embodiments, there are at least two rear-facing cameras, which are respectively any one of a main camera, a depth-of-field camera, a wide-angle camera, and a telephoto camera, to implement a background blurring function by fusing the main camera and the depth-of-field camera, and panoramic shooting and virtual reality (VR) shooting functions or other fusing shooting functions by fusing the main camera and the wide-angle camera. In some embodiments, the camera assembly 1506 further includes a flash. The flash may be a single color temperature flash, or may be a double color temperature flash. The double color temperature flash is a combination of a warm light flash and a cold light flash, and may be used for light compensation under different color temperatures.

The audio circuit 1507 includes a microphone and a speaker. The microphone is configured to acquire sound waves of a user and an environment, and convert the sound waves into electric signals and input the electrical signals into the processor 1501 for processing, or input the electrical signals into the radio frequency circuit 1504 to implement voice communication. For the purpose of stereo sound acquisition or noise reduction, there may be a plurality of microphones, respectively disposed at different parts of the terminal 1500. In some embodiments, the microphone may be further an array microphone or an omnidirectional acquisition microphone. The speaker is configured to convert electric signals from the processor 1501 or the radio frequency circuit 1504 into sound waves. The speaker may be a conventional thin-film speaker or a piezoelectric ceramic speaker. In a case that the speaker is the piezoelectric ceramic speaker, electric signals not only can be converted into sound waves audible to human, but also can be converted into sound waves inaudible to human for ranging and other purposes. In some embodiments, the audio circuit 1507 further includes an earphone jack.

The positioning component 1508 is configured to position a current geographic location of the terminal 1500 to implement navigation or a location-based service (LBS). The positioning component 1508 may be the United States' Global Positioning System (GPS), Russia's Global Navigation Satellite System (GLONASS), China's BeiDou Navigation Satellite System (BDS), and the European Union's Galileo Satellite Navigation System (Galileo)

The power supply 1509 is configured to supply power for various components in the terminal 1500. The power supply 1509 may be an alternating current, a direct current, a disposable battery, or a rechargeable battery. In the case that the power supply 1509 includes the rechargeable battery, the rechargeable battery may support wired charging or wireless charging. The rechargeable battery may be further configured to support a fast charge technology.

In some embodiments, the terminal 1500 further includes one or more sensors 1510. The one or more sensors 1510 include, but are not limited to: an acceleration sensor 1511, a gyroscope sensor 1512, a pressure sensor 1513, a fingerprint sensor 1514, an optical sensor 1416, and a proximity sensor 1516.

The acceleration sensor 1511 is configured to detect acceleration on three coordinate axes of a coordinate system established by the terminal 1500. For example, the acceleration sensor 1511 is configured to detect components of gravity acceleration on the three coordinate axes. The processor 1501 is configured to control, according to a gravity acceleration signal acquired by the acceleration sensor 1511, the display 1505 to display the user interface in a landscape view or a portrait view. The acceleration sensor 1511 may be further configured to acquire game or user motion data.

The gyroscope sensor 1512 is configured to detect a body direction and a rotation angle of the terminal 1500. The gyroscope sensor 1512 may cooperate with the acceleration sensor 1511 to acquire a 3D action performed by the user on the terminal 1500. The processor 1501 is capable of implementing the following functions according to the data acquired by the gyroscope sensor 1512: motion sensing (such as changing the UI according to a tilt operation of the user), image stabilization at shooting, game control, and inertial navigation.

The pressure sensor 1513 may be disposed on a side frame of the terminal 1500 and/or a lower layer of the display 1505. In the case that the pressure sensor 1513 is disposed on the side frame of the terminal 1500, the pressure sensor 1513 is configured to detect a holding signal of the user on the terminal 1500. The processor 1501 performs left and right hand recognition or a quick operation according to the holding signal acquired by the pressure sensor 1513. In the case that the pressure sensor 1513 is disposed on the lower layer of the display 1505, the processor 1501 controls an operable control on the UI according to a pressure operation of the user on the display 1505. The operable control includes at least one of a button control, a scroll bar control, an icon control and a menu control.

The fingerprint sensor 1514 is configured to acquire a fingerprint of a user, and the processor 1501 identifies an identity of the user according to the fingerprint acquired by the fingerprint sensor 1514, or the fingerprint sensor 1514 identifies an identity of the user according to the acquired fingerprint. In the case that the identity of the user is identified as a trusted identity, the processor 1501 authorizes the user to perform a related sensitive operation. The sensitive operation includes unlocking a screen, viewing encrypted information, downloading software, payment, changing settings, and the like. The fingerprint sensor 1514 may be disposed on a front surface, a back surface, or a side surface of the terminal 1500. In the case that the terminal 1500 is provided with a physical button or a vendor logo, the fingerprint sensor 1514 may be integrated with the physical button or the vendor logo.

The optical sensor 1416 is configured to acquire ambient light intensity. In some embodiments, the processor 1501 is configured to control display brightness of the display 1505 according to the ambient light intensity acquired by the optical sensor 1416. In some embodiments, in the case that the ambient light intensity is relatively high, the display brightness of the display 1505 is increased. In the case that the ambient light intensity is relatively low, the display brightness of the display 1505 is decreased. In another embodiment, the processor 1501 is further configured to dynamically adjust a camera parameter of the camera assembly 1506 according to the ambient light intensity acquired by the optical sensor 1416.

The proximity sensor 1516, also referred to as a distance sensor, is usually disposed on the front panel of the terminal 1500. The proximity sensor 1516 is configured to acquire a distance between a user and the front surface of the terminal 1500. In an embodiment, in the case that the proximity sensor 1516 detects that the distance between the user and the front surface of the terminal 1500 gradually becomes smaller, the display 1505 is controlled by the processor 1501 to switch from a screen-on state to a screen-off state. In a case that the proximity sensor 1516 detects that the distance between the user and the front surface of the terminal 1500 gradually becomes larger, the display 1505 is controlled by the processor 1501 to switch from the screen-off state to the screen-on state.

A person skilled in the art may understand that the structure shown in FIG. 15 does not constitute a limitation to the terminal 1500, and the terminal may include more or fewer components than those shown in the figure, or some components may be combined, or a different component deployment may be used.

An embodiment of the present disclosure further provides a terminal. The terminal is the first terminal according to the above embodiments. The first terminal includes at least one processor; and a memory configured to store at least one program code executable by the at least one processor. The at least one processor, when loading and executing the program code, is caused to execute instructions for:

displaying a live streaming interface of a live streaming room, the live streaming room being created using a stream push function of a target live streaming tool, and the live streaming interface including a co-hosting control;

sending a co-hosting request to a server in response to a trigger operation on the co-hosting control, the co-hosting request being configured to request a co-hosting with a target user account for co-hosting;

acquiring a first live data stream using the target live streaming tool in response to receiving co-hosting success information from the server, the first live data stream corresponding to the target user account; and displaying, in the live streaming interface, a live streaming picture of the live streaming account and a live streaming picture of the target user account based on a second live data stream and the first live data stream, the second live data stream corresponding to the live streaming account.

In some embodiments, the at least one processor, when loading and executing the program code, is caused to execute instructions for:

displaying at least one user account for co-hosting in the live streaming interface;

determining, in response to a selection operation on any user account in the at least one user account, a selected user account as the target user account; and sending the co-hosting request to the server, the co-hosting request being generated based on the target user account.

In some embodiments, the at least one processor, when loading and executing the program code, is caused to execute instructions for:

acquiring an associated account in an online state among associated accounts of the live streaming account and a viewer account in the live streaming room; and determining the at least one user account based on the associated account and the viewer account.

In some embodiments, the at least one processor, when loading and executing the program code, is caused to execute instructions for:

sending a first data acquisition request to the server, the first data acquisition request being configured to acquire the first live data stream; and receiving the first live data stream from the server using the target live streaming tool.

In some embodiments, the at least one processor, when loading and executing the program code, is caused to execute instructions for:

displaying a first live streaming window and a second live streaming window in the live streaming interface; and displaying, based on the second live data stream and the first live data stream, the live streaming picture of the live streaming account and the live streaming picture of the target user account in the first live streaming window and the second live streaming window respectively.

In some embodiments, the at least one processor, when loading and executing the program code, is caused to execute instructions for:

displaying first prompt information in the live streaming interface in response to receiving co-hosting failure information from the server, the first prompt information being configured to instruct the target user account to reject co-hosting.

In some embodiments, the at least one processor, when loading and executing the program code, is caused to execute instructions for:

sending a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop acquiring the live data stream of each other; and stopping acquiring the first live data stream in response to receiving the co-hosting termination information from the server.

An embodiment of the present disclosure provides a terminal. The terminal is the third terminal according to the above embodiments. The third terminal includes at least one processor; and a memory configured to store at least one program code executable by the at least one processor. The at least one processor, when loading and executing the at least one program code, is caused to execute instructions for:

displaying a live streaming interface of a live streaming room in response to a live stream watching request for a live streaming account, the live streaming room corresponding to the live streaming account;

acquiring a first live data stream and a second live data stream in response to receiving co-hosting start information from a server, the first live data stream corresponding to a target user account for co-hosting, the second live data stream corresponding to the live streaming account, the second live data stream being pushed by the live streaming account using a target live streaming tool, the target live streaming tool being configured to push the second live data stream for the live streaming account and pull the first live data stream for the live streaming account; and displaying, in the live streaming interface, a live streaming picture of the live streaming account and a live streaming picture of the target user account based on the second live data stream and the first live data stream.

In some embodiments, the at least one processor, when loading and executing the program code, is caused to execute instructions for:

sending a third data acquisition request to the server, the third data acquisition request being configured to acquire the first live data stream and the second live data stream; and receiving the first live data stream and the second live data stream from the server.

In some embodiments, the at least one processor, when loading and executing the program code, is caused to execute an instruction for:

stopping acquiring the first live data stream in response to receiving co-hosting termination information from the server.

Figure 16:
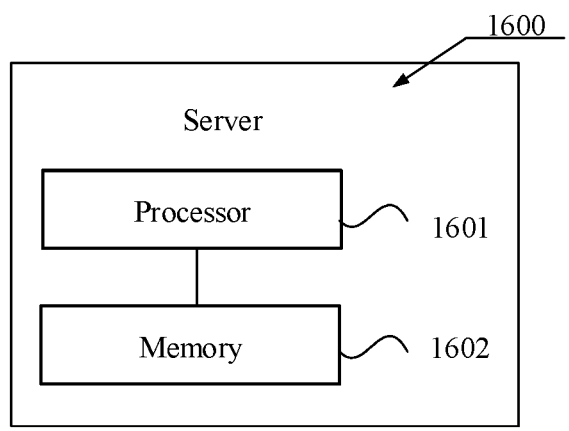
FIG. 16 is a block diagram of a server 1600 according to an exemplary embodiment.

FIG. 16 is a block diagram of a server 1600 according to an exemplary embodiment. The server 1600 may vary greatly due to different configurations or performance and may include at least one central processing unit (CPU) 1601 and at least one memory 1602, where the at least one memory 1602 stores at least one program code therein, wherein the at least one program code, when loaded and executed by the at least one processor 1601, causes the at least one processor 1601 to perform the method according to the method embodiments described above. The server 1600 may also have components such as a wired or wireless network interface, a keyboard, and an input/output interface, for input and output. The server 1600 may further include other components for implementing the functions of the device, which is not described herein.

An embodiment of the present disclosure provides a server. The server includes at least one processor; and a memory configured to store at least one program code executable by the at least one processor. The at least one processor, when loading and executing the at least one program code, is caused to execute instructions for:

sending a co-hosting request to a target user account in response to receiving the co-hosting request for the target user account from a live streaming account in a live streaming room;

acquiring a first live data stream in response to receiving co-hosting grant information from the target user account, the first live data stream corresponding to the target user account;

acquiring a second live data stream, the second live data stream corresponding to the live streaming account, the second live data stream being pushed by the live streaming account using a target live streaming tool, the target live streaming tool being configured to push the second live data stream for the live streaming account and pull the first live data stream for the live streaming account; and sending the first live data stream and the second live data stream to a viewer account in the live streaming room.

In some embodiments, the at least one processor, when loading and executing the at least one program code, is caused to execute instructions for:

sending first co-hosting success information to the live streaming account, the first co-hosting success information being configured to instruct the live streaming account to acquire the first live data stream; and sending the first live data stream to the live streaming account in response to receiving a first data acquisition request from the live streaming account.

In some embodiments, the at least one processor, when loading and executing the at least one program code, is caused to execute instructions for:

sending second co-hosting success information to the target user account, the second co-hosting success information being configured to instruct the target user account to acquire the second live data stream to the target user account; and sending the second live data stream to the target user account in response to receiving a second data acquisition request from the target user account.

In some embodiments, the at least one processor, when loading and executing the at least one program code, is caused to execute instructions for:

sending co-hosting start information to the viewer account in the live streaming room, the co-hosting start information being configured to instruct the viewer account to acquire the first live data stream and the second live data stream; and sending the first live data stream and the second live data stream to the viewer account in the live streaming room in response to receiving a third data acquisition request from the viewer account.

In some embodiments, the at least one processor, when loading and executing the at least one program code, is caused to execute instructions for:

sending co-hosting termination information to the live streaming account, the target user account, and the viewer account in response to receiving a co-hosting termination request, the co-hosting termination information being configured to instruct the live streaming account and the target user account to stop acquiring the live data stream of each other, and instruct the viewer account to stop acquiring the first live data stream, and the co-hosting termination request being triggered by either of the live streaming account or the target user account.

In an exemplary embodiment, a storage medium including instructions is further provided, such as a memory 1302 and a memory 1602 including instructions, where the instructions may be executed by the processor 1301 of the terminal 1300 or the processor 1601 of the server 1600 to accomplish the method described above. In some embodiments, the storage medium may be a non-transitory computer-readable storage medium. For example, the non-transitory computer-readable storage medium may include a read-only memory (ROM), a random-access memory (RAM), a compact disc read-only memory (CD-ROM), a magnetic tape, a floppy disk, an optical data storage device, or the like.

In an exemplary embodiment, a computer program product is further provided. The computer program product includes at least one instruction. The at least one instruction, when loaded and executed by a processor 1501 of a terminal 1500 or a processor 1601 of a server 1600, causes the terminal 1500 or the server 1600 to perform the processes in the methods for co-hosting in live streaming according to the above embodiments.

All the embodiments may be implemented separately, or may be implemented in combination with other embodiments, which are all considered to fall within the projection scope of the present disclosure.

The embodiments of the present disclosure provide a method and apparatus for co-hosting in live streaming, and a server, a terminal, and a non-transitory computer-readable storage medium thereof, such that live streaming is still implemented in the case that the live streaming account is under poor network conditions, thereby improving the live streaming effect.

According to a first aspect of the embodiments of the present disclosure, a method for co-hosting in live streaming is provided. The method includes:

sending a co-hosting request to a target user account in response to receiving the co-hosting request for the target user account from a live streaming account in a live streaming room, the co-hosting request being generated based on a trigger operation on a co-host control in a live streaming interface of the live streaming room;

acquiring a live data stream of the target user account in response to receiving co-hosting grant information from the target user account;

acquiring a live data stream pushed by the live streaming account using a target live streaming tool, the target live streaming tool being configured to push the live data stream of the live streaming account for the live streaming account and pull the live data stream of the target user account for the live streaming account; and sending the live data stream of the live streaming account and the live data stream of the target user account to a viewer account in the live streaming room.

In the solution according to the present disclosure, in the case that a co-hosting request from a live streaming account for establishing a co-hosting with a target user account is received, the co-hosting request is sent to the target user account; and in the case that co-hosting grant information from the target user account is received, a live data stream pushed by the live streaming account using a target live streaming tool and a live data stream of the target user account are both sent to a terminal corresponding to a viewer account, such that the terminal corresponding to the viewer account plays the two live data streams simultaneously, thereby implementing the co-hosting between the target user account and the live streaming account. The live streaming account does not need to push two live data streams, and co-hosting live streaming can be implemented even in the case that the live streaming account is under poor network conditions, thereby improving the live streaming effect.

In some embodiments, responsive to acquiring the live data stream of the target user account in response to receiving co-hosting grant information from the target user account, the method further includes:

sending the co-hosting success information to the live streaming account and the target user account;

sending the live data stream of the target user account to the live streaming account and sending the live data stream of the live streaming account to the target user account in response to receiving a first data acquisition request from the live streaming account and a second data acquisition request from the target user account.

The co-hosting success information is sent to the live streaming account and the target user account, to inform the live streaming account and the target user account that a co-hosting is going to be established between the two accounts, such that the two accounts pull live data stream of each other by sending a data acquisition request to the server.

In some embodiments, prior to sending the live data stream of the live streaming account and the live data stream of the target user account to the viewer account in the live streaming room, the method further includes:

sending co-hosting start information to the viewer account in the live streaming room, the co-hosting start information being configured to instruct the viewer account to acquire the live data stream of the live streaming account and the live data stream of the target user account; and sending the live data stream of the live streaming account and the live data stream of the target user account to the viewer account in the live streaming room in response to receiving a third data acquisition request from the viewer account.

The co-hosting start information is sent to the viewer account, to inform the viewer account that the live streaming account and the target user account are going to start co-hosting live streaming, such that the viewer account pulls the live data streams from the live streaming account and the target user account by sending a data acquisition request to the server.

In some embodiments, responsive to sending the live data stream of the live streaming account and the live data stream of the target user account to the viewer account in the live streaming room, the method further includes:

sending co-hosting termination information to the live streaming account, the target user account, and the viewer account in response to receiving a co-hosting termination request from either the live streaming account or the target user account, the co-hosting termination information being configured to instruct the live streaming account and the target user account to stop acquiring the live data stream of each other, and instruct the viewer account to stop acquiring the live data stream of the target user account.

The co-hosting termination information is sent to each account in the live streaming room in response to receiving a co-hosting termination request from any account participating in the co-hosting, such that each account can stop pulling the live data stream from the other party in response to receiving the co-hosting termination information, thereby terminating the co-hosting in live streaming.

According to a second aspect of the embodiments of the present disclosure, a method for co-hosting in live streaming is provided. The method includes:

displaying, based on a live streaming room created using a stream push function of a target live streaming tool, a live streaming interface of the live streaming room, the live streaming interface including a co-host control;

sending a co-hosting request to a server in response to a trigger operation on the co-host control, the co-hosting request being configured to request a co-hosting with a target user account for co-hosting;

acquiring a live data stream of the target user account using the target live streaming tool in response to receiving co-hosting success information from the server; and displaying, in the live streaming interface, a live streaming picture of the live streaming account and a live streaming picture of the target user account based on the acquired live data stream.

In the solution according to the present disclosure, a co-host control is provided in a live streaming interface of a live streaming room created using a stream push function of a target live streaming tool, and a live streaming account can send a co-hosting request to a target user account by triggering the co-host control; in the case that the target user account grants joining of the co-hosting request, the live streaming account acquires a live data stream of the target user account from a server using the target live streaming tool, thereby performing live streaming based on a live data stream of the live streaming account and the live data stream of the target user account, and implementing the co-hosting in live streaming. The live streaming account does not need to push two live data streams, and co-hosting live streaming can be implemented even in the case that the live streaming account is under poor network conditions, thereby improving the live streaming effect.

In some embodiments, sending the co-hosting request to the server in response to the trigger operation on the co-host control includes:

displaying at least one user account for co-hosting in the live streaming interface in response to the trigger operation on the co-host control, the at least one user account including an associated account in an online state among associated accounts of the live streaming account and a viewer account in the live streaming room;

determining, in response to a selection operation on any user account in the at least one user account, a selected user account as the target user account; and sending the co-hosting request generated based on the target user account to the server.

In the case that the co-host control is triggered, at least one user account capable of joining the co-hosting is displayed, to be selected by the live streaming account. Thus, in the case that any user account is selected, the co-hosting request is sent to the server based on the selected user account, to implement the co-hosting with the user account.

In some embodiments, acquiring the live data stream of the target user account using the target live streaming tool in response to receiving the co-hosting success information from the server includes:

sending a first data acquisition request to the server in response to receiving the co-hosting success information from the server, the first data acquisition request being configured to acquire the live data stream of the target user account; and receiving, using the target live streaming tool, the live data stream of the target user account from the server.

The first data acquisition request is sent to the server in response to receiving the co-hosting success information from server, so as to acquire the live data stream of the target user account, thereby implementing the co-hosting between the live streaming account and the target user account.

In some embodiments, displaying, in the live streaming interface, the live streaming picture of the live streaming account and the live streaming picture of the target user account based on the acquired live data stream includes:

displaying a first live streaming window and a second live streaming window side by side in the live streaming interface; and displaying, based on the acquired live data stream, the live streaming picture of the live streaming account and the live streaming picture of the target user account in the first live streaming window and the second live streaming window respectively.

By displaying the live streaming pictures of the live streaming account and the target user account in different live streaming windows of the live streaming interface, co-hosting live streaming between the live streaming account and the target user account is implemented.

In some embodiments, responsive to sending the co-hosting request to the server in response to the trigger operation on the co-host control, the method further includes:

displaying first prompt information in the live streaming interface in response to receiving co-hosting failure information from the server, the first prompt information being configured to prompt the live streaming account in response to the target user account rejecting the co-hosting.

In the case that the co-hosting failure information is received, the first prompt information is displayed to prompt the live streaming account, such that the live streaming account is informed of the case that the target user account rejects the co-hosting, and continues the subsequent live streaming process based on such a case, thereby ensuring smooth live streaming.

In some embodiments, the live streaming interface includes a co-hosting termination control; and in response to displaying, in the live streaming interface, the live streaming picture of the live streaming account and the live streaming picture of the target user account based on the acquired live data stream, the method further includes:

sending a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop pulling the live data streams of each other; and stopping acquiring the live data stream of the target user account in response to receiving the co-hosting termination information from the server.

The co-hosting termination control is provided in the live streaming interface of the live streaming account, such that the live streaming account can terminate the process of co-hosting live streaming by triggering the co-hosting termination control, thereby improving the live streaming efficiency, and further improving an anchor's live streaming experience.

According to a third aspect of the embodiments of the present disclosure, a method for co-hosting in live streaming is provided. The method includes:

displaying a live streaming interface of a live streaming room corresponding to a live streaming account in response to a live stream watching request for the live streaming account;

acquiring a live data stream pushed by the live streaming account using a target live streaming tool and a live data stream of the target user account in response to receiving co-hosting start information from a server, the target live streaming tool being configured to push the live data stream of the live streaming account for the live streaming account and pull the live data stream of the target user account for the live streaming account; and displaying, in the live streaming interface, a live streaming picture of the live streaming account and a live streaming picture of the target user account based on the live data stream of the live streaming account and the live data stream of the target user account.

In the solution according to the present disclosure, a live streaming picture of a live streaming room corresponding to a live streaming account is displayed in response to receiving a live stream watching request for the live streaming account, and in the case that co-hosting start information is received from a server, a live data stream pushed by the live streaming account using a target live streaming tool and a live data stream of the target user account are acquired, thereby displaying the two live data streams in the live streaming interface simultaneously, and thus implementing the co-hosting in live streaming. The live streaming account does not need to push two live data streams, and co-hosting live streaming can be implemented even in the case that the live streaming account is under poor network conditions, thereby improving the live streaming effect.

In some embodiments, acquiring the live data stream pushed by the live streaming account using the target live streaming tool and the live data stream of the target user account in response to receiving co-hosting start information from the server includes:

sending a third data acquisition request to the server in response to receiving the co-hosting start information, the third data acquisition request being configured to acquire the live data stream pushed by the live streaming account using the target live streaming tool and the live data stream of the target user account; and receiving the live data stream pushed by the live streaming account using the target live streaming tool and the live data stream of the target user account, which are sent by the server based on the third data acquisition request.

The third data acquisition request is sent to the server in the case that the co-hosting start information is received, so as to acquire the live data stream pushed by the live streaming account using the target live streaming tool and the live data stream of the target user account, and further perform live streaming based on the acquired live data streams, thereby implementing the co-hosting in live streaming.

In some embodiments, responsive to displaying, in the live streaming interface, the live streaming picture of the live streaming account and the live streaming picture of the target user account based on the live data stream of the live streaming account and the live data stream of the target user account, the method further includes:

stopping acquiring the live data stream of the target user account in response to receiving co-hosting termination information from the server.

In the case that the co-hosting termination information is received from the server, the live data stream of the target user account is no longer acquired, and only the live data stream pushed by the live streaming account using the target live streaming tool, to ensure playback of subsequent live streaming content of the anchor and ensure continuation of live streaming.

According a fourth aspect of the embodiments of the present disclosure, an apparatus for co-hosting in live streaming is provided. The apparatus includes:

a request sending unit, configured to send a co-hosting request to a target user account in response to receiving the co-hosting request for the target user account from a live streaming account in a live streaming room, the co-hosting request being generated based on a trigger operation on a co-host control in a live streaming interface of the live streaming room;

an acquiring unit, configured to acquire a live data stream of the target user account in response to receiving co-hosting grant information from the target user account;

wherein the acquiring unit is further configured to acquire a live data stream pushed by the live streaming account using a target live streaming tool, the target live streaming tool being configured to push the live data stream of the live streaming account for the live streaming account and pull the live data stream of the target user account for the live streaming account; and a data stream sending unit, configured to send the live data stream of the live streaming account and the live data stream of the target user account to a viewer account in the live streaming room.

In some embodiments, the apparatus further includes:

a first information sending unit, configured to send co-hosting success information to the live streaming account and the target user account; and the data stream sending unit is further configured to send the live data stream of the target user account to the live streaming account and send the live data stream of the live streaming account to the target user account in response to receiving a first data acquisition request from the live streaming account and a second data acquisition request from the target user account.

In some embodiments, the apparatus further includes:

a second information sending unit, configured to send co-hosting start information to the viewer account in the live streaming room, the co-hosting start information being configured to instruct the viewer account to acquire the live data stream of the live streaming account and the live data stream of the target user account; and the data stream sending unit is further configured to send the live data stream of the live streaming account and the live data stream of the target user account to the viewer account in the live streaming room in response to receiving a third data acquisition request from the viewer account.

In some embodiments, the apparatus further includes:

a third information sending unit, configured to send co-hosting termination information to the live streaming account, the target user account, and the viewer account in response to receiving a co-hosting termination request from either the live streaming account or the target user account, the co-hosting termination information being configured to instruct the live streaming account and the target user account to stop acquiring the live data stream of each other and instruct the viewer account to stop acquiring the live data stream of the target user account.

According a fifth aspect of the embodiments of the present disclosure, an apparatus for co-hosting in live streaming is provided. The apparatus includes:

a first display unit, configured to display, based on a live streaming room created using a stream push function of a target live streaming tool, a live streaming interface of the live streaming room, the live streaming interface including a co-host control;

a sending unit, configured to send a co-hosting request to a server in response to a trigger operation on the co-host control, the co-hosting request being configured to request a co-hosting with a target user account for co-hosting;

an acquiring unit, configured to acquire a live data stream of the target user account using the target live streaming tool in response to receiving co-hosting success information from the server; and a second display unit, configured to display, in the live streaming interface, a live streaming picture of the live streaming account and a live streaming picture of the target user account based on the acquired live data stream.

In some embodiments, the sending unit is configured to display at least one user account for co-hosting in the live streaming interface in response to the trigger operation on the co-host control, the at least one user account including an associated account in an online state among associated accounts of the live streaming account and a viewer account in the live streaming room; determine, in response to a selection operation on any user account in the at least one user account, a selected user account as the target user account; and send the co-hosting request generated based on the target user account to the server.

In some embodiments, the acquiring unit is configured to send a first data acquisition request to the server in response to receiving the co-hosting success information from the server, the first data acquisition request being configured to acquire the live data stream of the target user account; and receive, using the target live streaming tool, the live data stream of the target user account from the server.

In some embodiments, the second display unit is configured to display a first live streaming window and a second live streaming window side by side in the live streaming interface; and display, based on the acquired live data stream, the live streaming picture of the live streaming account and the live streaming picture of the target user account in the first live streaming window and the second live streaming window respectively.

In some embodiments, the apparatus further includes:

a third display unit, configured to display first prompt information in the live streaming interface in response to receiving co-hosting failure information from the server, the first prompt information being configured to prompt the live streaming account in response to the target user account rejecting the co-hosting.

In some embodiments, the live streaming interface includes a co-hosting termination control; and the sending unit is further configured to send a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop pulling the live data streams of each other; and the acquiring unit is further configured to stop acquiring the live data stream of the target user account in response to receiving the co-hosting termination information from the server.

According a sixth aspect of the embodiments of the present disclosure, an apparatus for co-hosting in live streaming is provided. The apparatus includes:

a display unit, configured to display a live streaming interface of a live streaming room corresponding to a live streaming account in response to a live stream watching request for the live streaming account; and an acquiring unit, configured to acquire a live data stream pushed by the live streaming account using a target live streaming tool and a live data stream of the target user account in response to receiving co-hosting start information from a server, the target live streaming tool being configured to push the live data stream of the live streaming account for the live streaming account and pull the live data stream of the target user account for the live streaming account;

wherein the display unit is further configured to display, in the live streaming interface, a live streaming picture of the live streaming account and a live streaming picture of the target user account based on the live data stream of the live streaming account and the live data stream of the target user account.

In some embodiments, the acquiring unit is configured to send a third data acquisition request to the server in response to receiving the co-hosting start information, the third data acquisition request being configured to acquire the live data stream pushed by the live streaming account using the target live streaming tool and the live data stream of the target user account; and receive the live data stream pushed by the live streaming account using the target live streaming tool and the live data stream of the target user account, which are sent by the server based on the third data acquisition request.

In some embodiments, the acquiring unit is further configured to stop acquiring the live data stream of the target user account in response to receiving the co-hosting termination information from the server.

According to a seventh aspect of the embodiments of the present disclosure, a server is provided. The server includes:

at least one processor; and a memory configured to store at least one instruction executable by the processor;

wherein the processor, when loading and executing the at least one instruction, is caused to perform the method for co-hosting in live streaming as described above.

According to an eighth aspect of the embodiments of the present disclosure, a terminal is provided. The terminal includes:

at least one processor; and a memory configured to store at least one instruction executable by the processor;

wherein the processor, when loading and executing the at least one instruction, is caused to perform the method for co-hosting in live streaming as described above.

According to a ninth aspect of the embodiments of the present disclosure, a non-transitory computer-readable storage medium is provided. The storage medium stores at least one instruction therein, wherein the at least one instruction, when loaded and executed by a processor of a server or terminal, causes the server or terminal to perform the methods for co-hosting in live streaming as described above.

According to a tenth aspect of the embodiments of the present disclosure, a computer program product is provided. The computer program product stores at least one instruction, wherein the at least one instruction, when loaded and executed by a processor of a server or terminal, causes the server or terminal to perform the methods for co-hosting in live streaming as described above.

What is claimed is:

1. A method for co-hosting in live streaming, applicable to a server, the method comprising:
    sending, by the server, a co-hosting request to a target user account of a second terminal in response to receiving the co-hosting request for the target user account from a live streaming account of a first terminal in a live streaming room, the live streaming room being created using a stream push function of a target live streaming tool of the first terminal in response to a trigger operation on a live streaming start control on a web page being accessed by the live streaming account and being displayed in a live streaming interface of the live streaming account;
    initiating, by an application program interface (API) service of the server and in response to receiving co-hosting grant information from the target user account after the target user account received the co-hosting request, an interaction room for the live streaming account and the target user account to allocate an interaction room service for the live streaming account and the target user account;
    sending, via the API service, an update request to database based on allocation of the interaction room service;
    acquiring, by the server, a first live data stream from the second terminal in response to receiving the co-hosting grant information from the target user account, the first live data stream corresponding to the target user account;
    acquiring, by the server, a second live data stream from the first terminal in response to the co-hosting grant information from the target user account, the second live data stream corresponding to the live streaming account, the second live data stream being pushed by the live streaming account using the target live streaming tool, wherein the target live streaming tool is configured to push the second live data stream for the live streaming account and pull the first live data stream for the live streaming account;
    sending, by the server, the first live data stream individually to the live streaming account for display on the live streaming interface of the living streaming account in response to receiving a first acquisition request from the first terminal;
    sending, by the server, the second live data stream individually to the target user account for display in a live streamlining interface of target user account in response to receiving a second acquisition request from the second terminal; and
    sending, by the server and in response to receiving a third acquisition request from a viewer account of a third terminal, the first live data stream and the second live data stream directly to the viewer account in the live streaming room, wherein the first live data stream and the second live data stream are sent as separate live data streams.

2. The method according to claim 1, further comprising:
    sending first co-hosting success information to the live streaming account, the first co-hosting success information being configured to instruct the live streaming account to acquire the first live data stream.

3. The method according to claim 1, further comprising:
    sending second co-hosting success information to the target user account, the second co-hosting success information being configured to instruct the target user account to acquire the second live data stream.

4. The method according to claim 1, further comprising:
    sending co-hosting start information to the viewer account, the co-hosting start information being configured to instruct the viewer account to acquire the first live data stream and the second live data stream.

5. The method according to claim 1, further comprising:
    sending co-hosting termination information to the live streaming account, the target user account, and the viewer account in response to receiving a co-hosting termination request, the co-hosting termination information being configured to instruct the live streaming account and the target user account to stop acquiring the first live data stream and the second live data stream, respectively, and instruct the viewer account to stop acquiring the first live data stream and only acquire the second live data stream, and the co-hosting termination request being triggered by one of the live streaming account and the target user account.

6. The method according to claim 1, wherein the target live streaming tool is Open Broadcaster Software.

7. A server, comprising:
    a processor; and
    a memory configured to store at least one instruction executable by the processor;
    wherein the processor, when loading and executing the at least one instruction, is caused to perform the following processes:
    sending a co-hosting request to a target user account of a second terminal in response to receiving the co-hosting request for the target user account from a live streaming account in a live streaming room of a first terminal, the live streaming room being created using a stream push function of a target live streaming tool of the first terminal in response to a trigger operation on a live streaming start control on a web page being accessed by the live streaming account and being displayed in a live streaming interface of the live streaming account;
    initiating, by an application program interface (API) service of the server and in response to receiving co-hosting grant information from the target user account after the target user account received the co-hosting request, an interaction room for the live streaming account and the target user account to allocate an interaction room service for the live streaming account and the target user account:
    sending, via the API service, an update request to database based on allocation of the interaction room service;
    acquiring a first live data stream from the second terminal, in response to receiving the co-hosting grant information from the target user account, the first live data stream corresponding to the target user account;
    acquiring a second live data stream from the first terminal in response to the co-hosting grant information from the target user account, the second live data stream corresponding to the live streaming account, the second live data stream being pushed by the live streaming account using the target live streaming tool, wherein the target live streaming tool is configured to push the second live data stream for the live streaming account and pull the first live data stream for the live streaming account;

sending the first live data stream individually to the live streaming account for display on the live streaming interface of the living streaming account in response to receiving a first acquisition request from the first terminal;

sending the second live data stream individually to the target user account for display in a live streamlining interface of target user account in response to receiving a second acquisition request from the second terminal; and sending, in response to receiving a third acquisition request from a viewer account of a third terminal, the first live data stream and the second live data stream directly to the viewer account in the live streaming room, wherein the first live data stream and the second live data stream are sent as separate live data streams.

8. The server according to claim 7, wherein the processor, when loading and executing the at least one instruction, is caused to perform the following processes:

sending first co-hosting success information to the live streaming account, the first co-hosting success information being configured to instruct the live streaming account to acquire the first live data stream.

9. The server according to claim 7, wherein the processor, when loading and executing the at least one instruction, is caused to perform the following processes:

sending second co-hosting success information to the target user account, the second co-hosting success information being configured to instruct the target user account to acquire the second live data stream.

10. The server according to claim 7, wherein the processor, when loading and executing the at least one instruction, is caused to perform the following processes:

sending co-hosting start information to the viewer account, the co-hosting start information being configured to instruct the viewer account to acquire the first live data stream and the second live data stream.

11. The server according to claim 7, wherein the processor, when loading and executing the at least one instruction, is caused to perform the following processes:

sending co-hosting termination information to the live streaming account, the target user account, and the viewer account in response to receiving a co-hosting termination request, the co-hosting termination information being configured to instruct the live streaming account and the target user account to stop acquiring the first live data stream and the second live data stream, respectively, and instruct the viewer account to stop acquiring the first live data stream and only acquire the second live stream, and the co-hosting termination request being triggered by one of the live streaming account and the target user account.

12. A method for co-hosting in live streaming, comprising:

displaying, by a first terminal, a live streaming interface of a live streaming room, the live streaming room being created using a stream push function of a target live streaming tool of the first terminal in response to a trigger operation on a live streaming start control on a web page being accessed by the live streaming account, and the live streaming interface comprising a co-host control;

sending, by the first terminal, a co-hosting request to a server in response to a trigger operation on the co-host control, the co-hosting request being configured to request co-hosting with a target user account of a second terminal for co-hosting;

sending, by the server, the co-hosting request to the target user account of the second terminal in response to receiving the co-hosting request for the target user account from a live streaming account of the first terminal in a live streaming room;

initiating, by an application program interface (API) service of the server and in response to receiving co-hosting grant information from the target user account after the target user account received the co-hosting request, an interaction room for the live streaming account and the target user account to allocate an interaction room service for the live streaming account and the target user account:

sending, via the API service, an update request to database based on allocation of the interaction room service;

acquiring, by the server, a first live data stream from the second terminal in response to receiving the co-hosting grant information from the target user account, the first live data stream corresponding to the target user account;

acquiring, from the server, by the first terminal, the first live data stream from the second terminal using the target live streaming tool in response to receiving co-hosting success information from the server;

acquiring, by the server, a second live data stream from the first terminal in response to the co-hosting grant information from the target user account, the second live data stream corresponding to the live streaming account, the second live data stream being pushed by the live streaming account using the target live streaming tool, the target live streaming tool being configured to push the second live data stream for the live streaming account and pull the first live data stream for the live streaming account;

sending, by the server, the first live data stream individually to the live streaming account for display on the live streaming interface of the living streaming account in response to receiving a first acquisition request from the first terminal;

sending, by the server, the second live data stream individually to the target user account for display in a live streamlining interface of target user account in response to receiving a second acquisition request from the second terminal;

sending directly, by the server and in response to receiving a third acquisition request from a viewer account of a third terminal, the first live data stream and the second live data stream to the viewer account in the live streaming room, wherein the first live data stream and the second live data stream are sent as separate live data streams; and displaying, by the first terminal, in the live streaming interface, a live streaming picture of the live streaming account and a live streaming picture of the target user account based on the second live data stream and the first live data stream.

13. The method according to claim 12, wherein said sending, by the first terminal, the co-hosting request to the server comprises:

displaying, by the first terminal, at least one user account for co-hosting in the live streaming interface;

determining, by the first terminal, in response to a selection operation on any user account in the at least one user account, a selected user account as the target user account; and sending, by the first terminal, the co-hosting request to the server, the co-hosting request being generated based on the target user account.

14. The method according to claim 13, further comprising:

acquiring, by the first terminal, an associated account in an online state among associated accounts of the live streaming account and a viewer account in the live streaming room; and determining, by the first terminal, the at least one user account based on the associated account and the viewer account.

15. The method according to claim 13, wherein before said displaying, by the first terminal, at least one user account for co-hosting in the live streaming interface, the method further comprises:

sending, by the first terminal, an account acquisition request to the server in response to the trigger operation on the co-host control;

acquiring, by the server, at least one user account, the at least one user account comprising an associated account in an online state among associated accounts of the live streaming account and a viewer account in the live streaming room;

filtering, by the server, the at least one user account to remove any user account that does not meet a co-hosting condition in the at least one user account; and sending, by the server, the filtered at least one user account to the first terminal.

16. The method according to claim 15, wherein a live streaming type of the at least one user account comprises one of: live streaming based on a web page, live streaming by a live streaming client, or live streaming by a live streaming assistant client, and the co-hosting condition comprises that a web page or client version corresponding to the live streaming type of the user account meets a target condition.

17. The method according to claim 12, wherein said displaying, by the first terminal, in the live streaming interface, the live streaming picture of the live streaming account and the live streaming picture of the target user account based on the second live data stream and the first live data stream comprises:

displaying, by the first terminal, a first live streaming window and a second live streaming window in the live streaming interface; and displaying, by the first terminal, based on the second live data stream and the first live data stream, the live streaming picture of the live streaming account and the live streaming picture of the target user account in the first live streaming window and the second live streaming window respectively.

18. The method according to claim 12, further comprising:

displaying, by the first terminal, first prompt information in the live streaming interface in response to receiving co-hosting failure information from the server, the first prompt information being configured to indicate that the target user account rejects co-hosting.

19. The method according to claim 12, wherein the live streaming interface further comprises a co-hosting termination control; and the method further comprises:

sending, by the first terminal, a co-hosting termination request to the server in response to a trigger operation on the co-hosting termination control, the co-hosting termination request being configured to instruct the server to send co-hosting termination information to the live streaming account and the target user account, the co-hosting termination information being configured to instruct the live streaming account and the target user account to stop acquiring the first live data stream and second live data stream, respectively; and stopping, by the first terminal, acquiring the first live data stream in response to receiving the co-hosting termination information from the server.

* * * * *